(12) United States Patent
Horade et al.

(10) Patent No.: US 10,013,928 B2
(45) Date of Patent: Jul. 3, 2018

(54) TOUCH PANEL

(71) Applicant: GUNZE LIMITED, Kyoto (JP)

(72) Inventors: Naoki Horade, Kyoto (JP); Jiro Okuno, Kyoto (JP)

(73) Assignee: GUNZE LIMITED, Kyoto (JP)

( * ) Notice: Subject to any disclaimer, the term of this patent is extended or adjusted under 35 U.S.C. 154(b) by 195 days.

(21) Appl. No.: 14/845,904

(22) Filed: Sep. 4, 2015

(65) Prior Publication Data
US 2016/0070396 A1     Mar. 10, 2016

(30) Foreign Application Priority Data

Sep. 5, 2014    (JP) .................................. 2014-181645
Dec. 25, 2014   (JP) .................................. 2014-262669

(51) Int. Cl.
G06F 3/044   (2006.01)
G09G 3/36    (2006.01)

(52) U.S. Cl.
CPC ............... *G09G 3/36* (2013.01); *G06F 3/044* (2013.01); *G06F 2203/04111* (2013.01)

(58) Field of Classification Search
CPC .......... G06F 3/047; G06F 3/044; G09G 3/36; G09G 2300/0426
See application file for complete search history.

(56) References Cited

U.S. PATENT DOCUMENTS

| 2004/0104827 | A1* | 6/2004 | Katsuki ................. G06F 3/0436 341/34 |
| 2010/0085315 | A1 | 4/2010 | Hsih |
| 2011/0099805 | A1* | 5/2011 | Lee ......................... G06F 3/044 29/846 |

(Continued)

FOREIGN PATENT DOCUMENTS

| JP | 3152077 U | 7/2009 |
| JP | 2010-211823 A | 9/2010 |

(Continued)

OTHER PUBLICATIONS

Decision to Grant a Patent in the corresponding Japanese Patent Application No. 2014-262669 dated Jul. 29, 2015.

(Continued)

*Primary Examiner* — Antonio Xavier
(74) *Attorney, Agent, or Firm* — Global IP Counsels, LLP

(57) ABSTRACT

A touch panel which includes: a first electrode substrate; a second electrode substrate; a plurality of X-direction transparent electrodes formed on a main surface of the first electrode substrate; a plurality of Y-direction transparent electrodes formed on a main surface of the second electrode substrate; a plurality of X-direction drawn-round wires directly connected to transparent electrodes that are connected to the plurality of X-direction transparent electrodes; a plurality of X-direction drawn-round wires directly connected to external connections that are connected by the plurality of X-direction drawn-round wires directly connected to transparent electrodes and a plurality of through-holes; and a plurality of Y-direction drawn-round wires connected to the plurality of Y-direction transparent electrodes.

3 Claims, 26 Drawing Sheets

(56) References Cited

U.S. PATENT DOCUMENTS

2011/0157086 A1* 6/2011 Ozeki ................... G06F 3/044
 345/174
2013/0169558 A1* 7/2013 Min ..................... G06F 3/044
 345/173

FOREIGN PATENT DOCUMENTS

| JP | 2012-141690 A | 7/2012 |
|---|---|---|
| JP | 5084698 B | 11/2012 |

OTHER PUBLICATIONS

Office Action in the corresponding Japanese Patent Application No. 2014-262669 dated May 7, 2015.

* cited by examiner

PRIOR ART

PRIOR ART

PRIOR ART

TOUCH PANEL

CROSS-REFERENCE TO RELATED APPLICATIONS

This application claims priority to Japanese Patent Application No. 2014-181645 filed on Sep. 5, 2014 and Japanese Patent Application No. 2014-262669 filed on Dec. 25, 2014. The entire disclosures of Japanese Patent Application No. 2014-181645 and Japanese Patent Application No. 2014-262669 are hereby incorporated herein by reference.

BACKGROUND

Technical Field

The present invention relates to a touch panel, more specifically to a touch panel with a frame region narrowed.

Related Art

FIG. 24 is a cross-sectional view of a conventional touch panel 60. An upper electrode substrate 62 having a plurality of X-direction transparent electrodes 61 on a lower surface thereof and a lower electrode substrate 64 having a plurality of Y-direction transparent electrodes 63 on an upper surface thereof are being laminated via an adhesive layer 65. The plurality of X-direction transparent electrodes 61 are oppositely faced to the plurality of Y-direction transparent electrodes 63 with an adhesive layer 65 placed between. A plurality of X-direction drawn-round wires 66 are arranged on the lower surface of the upper electrode substrate 62. A plurality of Y-direction drawn-round wires are arranged on the upper surface of the lower electrode substrate 64. FIG. 24 does not, however, indicate the plurality of Y-direction drawn-round wires.

FIG. 25 is a layout drawing of a plurality of X-direction transparent electrodes 61 and a plurality of X-direction drawn-round wires 66 formed on a lower surface of the upper electrode substrate 62 of the conventional touch panel 60 (For instance, JP 5084698 B2). While the plurality of X-direction transparent electrodes 61 and the plurality of X-direction drawn-round wires 66 should originally be indicated in a broken line due to being arranged on the lower surface of the upper electrode substrate 62, the X-direction transparent electrodes 61 and the X-direction drawn-round wires 66 are indicated in a solid line to facilitate visualization.

In each of the X-direction transparent electrodes 61, a large number of diamond-shaped transparent electrode patterns 61a are electrically connected to a plurality of connecting electrodes 61b each having a small width in an X direction (lateral direction) and are aligned in a lateral direction of the touch panel 60. A large number of (for instance, 30) X-direction transparent electrodes 61 are aligned parallel to a longitudinal direction of the touch panel 60. X-direction transparent electrodes 61 are referred to as a first line, a second line, and a third line or the like from the top.

Each X-direction drawn-round wire 66 is connected to each X-direction transparent electrode 61. Accordingly, the X-direction drawn-round wires 66 are as many as the X-direction transparent electrodes 61. For instance, the number of the X-direction transparent electrodes 61 is 30, the number of the X-direction drawn-round wires 66 is also 30. For the purpose of illustration, FIG. 25 shows an example that the number of the X-direction transparent electrodes 61 is 8 and the number of the X-direction drawn-round wires 66 is 8.

As shown in FIG. 25, No. 1 X-direction drawn-round wire 66 is connected to an X-direction transparent electrode 61 on the first line. No. 2 X-direction drawn-round wire 66 is connected to an X-direction transparent electrode 61 on the second line. Similarly, No. 8 X-direction drawn-round wire 66 is connected to an X-direction transparent electrode 61 on the eighth line.

As shown in FIG. 25, No. 1 to No. 8 X-direction drawn-round wires 66 are arranged on a lower surface of the upper electrode substrate 62.

In the case of FIG. 25, when the wire width (line) and the wire space of the X-direction drawn-round wires 66 are each L ($\mu$m), S ($\mu$m), the lateral width of the area of the X-direction drawn-round wires 66 placed on the lower surface of the upper electrode substrate 62 needs to be at least (8L+7S) ($\mu$m).

FIG. 26 is a layout drawing of a plurality of Y-direction transparent electrodes 63 and a plurality of Y-direction drawn-round wires 67 formed on an upper surface of the lower electrode substrate 64 of the conventional touch panel 60. In each Y-direction transparent electrode 63, a large number of diamond-shaped transparent electrode patterns 63a are electrically connected to each other by a large number of connecting electrodes 63b each having a small width in a Y-direction (longitudinal direction) and are aligned in a longitudinal direction of the touch panel 60. A large number of (for example, 40) Y-direction transparent electrodes 63 are aligned parallel to a lateral direction of the touch panel 60. The Y-direction transparent electrodes 63 are referred to as a first row, a second row, a third row, a fourth row and so on from left. Transparent electrode patterns 63a in one Y-direction transparent electrode 63 are arranged in a blank portion surrounded by four transparent electrode patterns 61a of X-direction transparent electrodes 61. More specifically, the upper electrode substrate 62 is adhered to the lower electrode substrate 64 so that the transparent electrode patterns 61a of the X-direction transparent electrodes 61 may not be overlapped with the transparent electrode patterns 63a of the Y-direction transparent electrodes 63.

Each Y-direction drawn-round wire 67 is connected to each Y-direction transparent electrode 63. Accordingly, the number of the Y-direction drawn-round wires 67 is the same as the number of the Y-direction transparent electrodes 63. For instance, when the number of the Y-direction transparent electrodes 63 is 40, the number of the Y-direction drawn-round wires 67 is also 40. FIG. 26 illustrates an example in which the number of the Y-direction transparent electrodes 63 is 10 and the number of the Y-direction drawn-round wires 67 is 10.

As shown in FIG. 26, No. 1 Y-direction drawn-round wire 67 is connected to Y-direction transparent electrodes 63 on the first row. No. 2 Y-direction drawn-round wire 67 is connected to a plurality of Y-direction transparent electrodes 63 on the second row. As mentioned above, No. 10 Y-direction drawn-round wire 67 is connected to a plurality of Y-direction transparent electrodes 63 on the tenth row.

As shown in FIG. 26, No. 1 Y-direction drawn-round wire 67, No. 2 Y-direction drawn-round wire 67, . . . No. 10 Y-direction drawn-round wire 67 are arranged on the upper surface of the lower electrode substrate 64.

When a finger approaches to the touch panel 60, capacitance or the like in the X-direction transparent electrodes 61 and the Y-direction transparent electrodes 63 varies. X-coordinate and Y-coordinate of the position of the finger are detected by the detection of such electrical changes while switching a signal to be transmitted to each electrode.

Detection methods include a self-capacity method and a mutual capacity detection method.

A touch panel is used in combination with a liquid crystal panel. Since frames of liquid crystal panels have been narrowed, frames of touch panels also need to become narrowed. At present, the narrowing of liquid crystal panels is prominent in left and right sides thereof. When the left and right frames of the touch panels become narrowed in accordance with the narrow frames of the liquid crystal panels, the area of drawn-round wires housed in the frame portions of the touch panels runs short.

For instance, when the number of the X-direction transparent electrodes and the X-direction drawn-round wires is respectively 30, the X-direction drawn-round wires each have a wire width (line) of 30 μm and a wire space of 30 μm, the area of each of the drawn-round wires needs to have a lateral width of about 2 mm. This makes the lateral width of the area of the drawn-round wires becomes smaller, resulting in impossible to use the drawn-round wires. However, there is a limit for making the wire width and the wire space smaller.

SUMMARY

It is an object of the present invention to materialize a touch panel having a narrow frame width.

Inventors of the present invention have found out that it is possible to make the width of a wiring area by dividing the drawn-round wires on a plurality of surfaces in a divided manner and connecting divided wires each other by use of a through-hole and have completed the present invention. Since there is currently a strong request for making the width of the wiring area of the X-direction drawn-round wires, (the width of left and right frame) narrowing of the wiring area of the X-direction drawn-round wire will be mainly described. The present invention is usable for narrowing the width of the wiring area of the Y-direction drawn-round wires (width of the top and bottom frame) without problems.

According to a first aspect of the present invention, there is provided a touch panel which includes: a first electrode substrate; a second electrode substrate; a plurality of first transparent electrodes formed on a main surface of the first electrode substrate; a plurality of second transparent electrodes formed on a main surface of the second electrode substrate; a plurality of first drawn-round wires directly connected to transparent electrodes that are connected to the plurality of first transparent electrodes and are partially used for external connection; a plurality of first drawn-round wires directly connected to external connections that are connected by a plurality of first drawn-round wires directly connected to the rest of transparent electrodes that are not used for external connection and a plurality of through-holes; a plurality of first drawn-round wires directly connected to external connections that are connected by a plurality of through holes; and a plurality of second drawn-round wires connected to the plurality of second transparent electrodes.

According to a second embodiment of the present invention, the plurality of second drawn-round wires include: a plurality of second drawn-round wires directly connected to transparent electrodes that are connected to the plurality of second transparent electrodes; and a plurality of second drawn-round wires directly connected to external connections that are connected by the plurality of second drawn-round wires directly connected to transparent electrodes and a plurality of through-holes.

According to a third aspect of the present invention, the touch panel further includes: an adhesive layer for joining the first and second electrode substrates; a plurality of first drawn-round wires directly connected to transparent electrodes that are formed on a main surface of the first electrode substrate; a plurality of first drawn-round wires directly connected to external connections that are formed on a main surface of the second electrode substrate; and the plurality of through-holes for penetrating the plurality of first drawn-round wires and the adhesive layer.

According to a fourth aspect of the present invention, the touch panel further includes: an adhesive layer for joining the first and second electrode substrates; the plurality of first drawn-round wires directly connected to transparent electrodes that are formed on one main surface of the first electrode substrate; the plurality of first drawn-round wires directly connected to external connections that are formed on the other main surface of the first electrode substrate; and the plurality of through-holes for penetrating the plurality of first drawn-round wires.

According to a fifth aspect of the present invention, the touch panel further includes: an adhesive layer for joining the first and second electrode substrates; the plurality of first drawn-round wires directly connected to transparent electrodes that are formed on a main surface of the first electrode substrate; the plurality of first drawn-round wires directly connected to external connections that are formed on a main surface of the second electrode substrate; and the plurality of through-holes for penetrating the first electrode substrate, the adhesive layer, and the second electrode substrate.

According to a sixth aspect of the present invention, the touch panel further includes: an adhesive layer for joining the first and second electrode substrates; the plurality of first drawn-round wires directly connected to transparent electrodes that are formed on a main surface of the first electrode substrate; the plurality of first drawn-round wires directly connected to external connections that are formed on a main surface of the second electrode substrate; and a plurality of through-holes for penetrating the first electrode substrate and the adhesive layer.

According to a seventh aspect of the present invention, the touch panel further includes: a cover film having a main surface; a first adhesive layer for joining the cover film and the first electrode substrate; a second adhesive layer for joining the first and second electrode substrates; a plurality of first drawn-round wires directly connected to transparent electrodes that are formed on a main surface of the first electrode substrate; the plurality of first drawn-round wires directly connected to external connections that are formed on a main surface of the cover film; and the plurality of through-holes for penetrating the first adhesive layer.

According to an eighth aspect of the present invention, a touch panel includes: an electrode substrate having two main surfaces; a plurality of first transparent electrodes formed on one main surface on the electrode substrate; a plurality of second transparent electrodes formed on the other main surface of the electrode substrate; a plurality of first drawn-round wires directly connected to transparent electrodes that are connected to the plurality of first transparent electrodes and are partially used for external connection; a plurality of first drawn-round wires directly connected to external connections that are connected by the rest of the plurality of first drawn-round wires directly connected to transparent electrodes that are not used for external connection and a plurality of through-holes; and the plurality of second drawn-round wires connected to the plurality of second transparent electrodes.

According to a ninth aspect of the present invention, the plurality of second drawn-round wires each include: a plurality of second drawn-round wires directly connected to transparent electrodes that are connected to the plurality of second transparent electrodes; and a plurality of second drawn-round wires directly connected to external connections that are connected by the plurality of second drawn-round wires directly connected to transparent electrodes and a plurality of through-holes.

According to a tenth aspect of the present invention, the touch panel includes: the plurality of first drawn-round wires directly connected to transparent electrodes that are formed on one main surface of the electrode substrate; the plurality of first drawn-round wires directly connected to external connections that are formed on the other main surface of the electrode substrate; and the plurality of through-holes for penetrating the electrode substrate.

According to an eleventh aspect of the present invention, the touch panel includes: a cover film having a main surface; an adhesive layer for joining the cover film and the electrode substrate; the plurality of first drawn-round wires directly connected to transparent electrodes that are formed on one main surface of the electrode substrate; the plurality of first drawn-round wires directly connected to external connections that are formed on a main surface of the cover film; and the plurality of through-holes for penetrating the adhesive layer.

According to a twelfth aspect of the present invention, a touch panel includes: an electrode substrate; a plurality of first transparent electrodes formed on one main surface of the electrode substrate; a plurality of second transparent electrodes formed on the other main surface of the electrode substrate; a plurality of first transparent electrodes directly connected to transparent electrodes that are connected to the plurality of the first transparent electrodes and are partially used for external connection; a plurality of first drawn-round wires directly connected to external connections that are not used for external connection and a plurality of through-holes; and a plurality of second drawn-round wires connected to the plurality of second transparent electrodes.

According to a thirteenth aspect of the present invention, in the touch panel, the plurality of second drawn-round wires each include: a plurality of second drawn-round wires directly connected to transparent electrodes that are connected to the plurality of second transparent electrodes; and a plurality of second drawn-round wires directly connected to external connections that are connected by the plurality of second drawn-round wires directly connected to external connections and a plurality of through-holes.

According to a fourteenth aspect of the present invention, the touch panel further includes: a cover film having a main surface; an adhesive layer for joining the cover film and the electrode substrate; the plurality of first drawn-round wires directly connected to transparent electrodes that are formed on a main surface of the electrode substrate; the plurality of first drawn-round wires directly connected to external connections that are formed on a main surface of the cover film; and the plurality of through-holes for penetrating the adhesive layer.

To have better understanding, hereinafter, a first transparent electrode is referred to as an X-direction transparent electrode, a second transparent electrode that intersects the first transparent electrode at a predetermined angle is referred to as a Y-direction transparent electrode; and a first drawn-round wire is referred to as an X-direction drawn-round wire, and a second drawn-round wire is referred to as a Y-direction drawn-round wire (an X-direction is a lateral direction of the touch panel and Y-direction is a longitudinal direction of the touch panel). However, the first transparent electrode may be referred to as a Y-direction transparent electrode, the second transparent electrode may be referred to as an X-direction transparent electrode, the first drawn-round wire may be referred to as a Y-direction drawn-round wire, and the second drawn-round wire may be referred to as an X-direction drawn-round wire.

While the first transparent electrode (X-direction transparent electrode) and the second transparent electrode (Y-direction transparent electrode) are three-dimensionally twisted, the first transparent and second transparent electrodes intersect at a predetermined angle when planarly viewed (when viewed from a direction perpendicular to a main surface of the touch panel). To make the aforementioned transparent electrodes simpler, it is expressed that "the first and second transparent electrodes intersect at a predetermined angle." Although the first transparent electrode usually intersects the second transparent electrode at 90 degrees, the angle is not limited to 90 degrees.

To have easier understanding, "a first surface side" is hereinafter referred to as "an upper surface" and "a second surface side" is hereinafter referred to as "a lower surface" in accordance with drawings. However, there is not necessarily a physically fixed relationship between the first and second surface sides (The relationship between the first and second surface sides varies in accordance with the direction where the touch panel is disposed).

While a transparent electrode may be formed of a transparent thin layer such as indium thin oxide or an ultrafine conductive wire, these are herein collectively referred to as transparent electrodes.

In the present invention, it is possible to reduce the width of a wiring area by arranging drawn-round wires that have been divided into a plurality of surfaces and connecting the divided wires by use of through-holes. As a result, a touch panel with a narrowed frame width has been materialized.

For a full understanding of the present invention, reference should now be made to the following detailed description of the preferred embodiments of the invention as illustrated in the accompanying drawings.

DETAILED DESCRIPTION OF EMBODIMENTS

Figure 1:
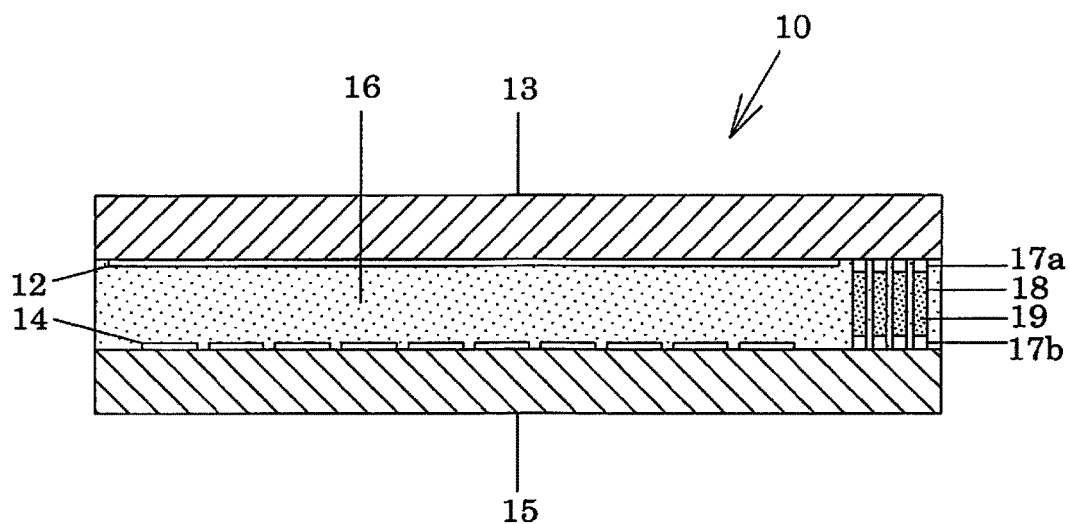
FIG. 1 is a cross-sectional view of Example 1 of a touch panel of the present invention.

The preferred embodiments of the present invention will now be described with reference to FIGS. 1 to 26. Identical elements in the figure are designated with the same reference numerals. To have easier understanding, each drawing is not indicated in actual size ratio but partially enlarged or downsized.

Example 1 of Touch Panel of the Present Invention

FIG. 1 is a cross-sectional view of a touch panel in Example 1 of the present invention. In a touch panel 10, a first electrode substrate 13 having a plurality of X-direction transparent electrodes 12 on a lower surface thereof, and a second electrode substrate 15 having a plurality of Y-direction transparent electrodes 14 on an upper surface thereof are joined by an adhesive layer 16. The plurality of X-direction transparent electrodes 12 and the plurality of Y-direction transparent electrodes 14 are disposed opposite to each other separating the adhesive layer 16.

Figure 2:
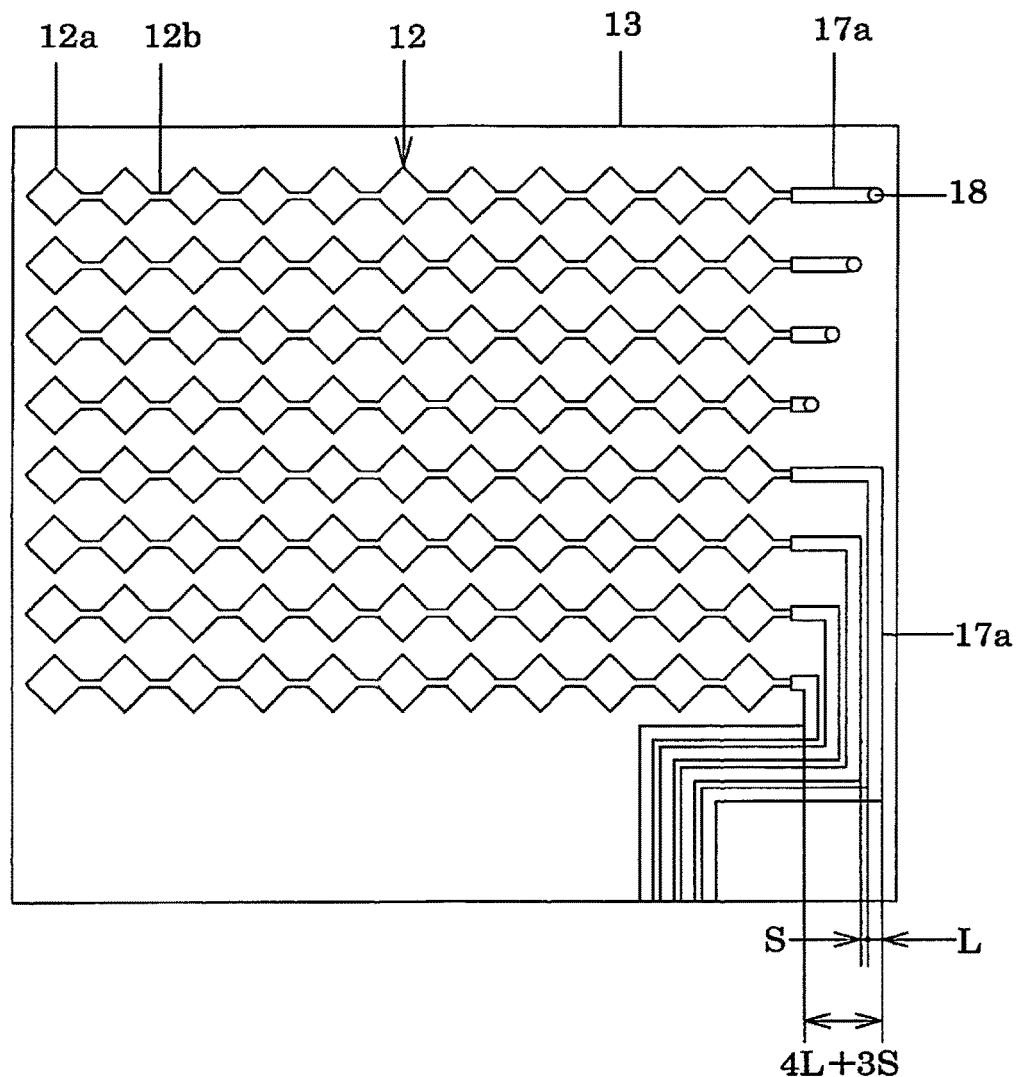
FIG. 2 is a layout drawing illustrating X-direction transparent electrodes and X-direction drawn-round wires formed on a lower surface of a first electrode substrate of a touch panel in Example 1 of the present invention.

As shown in FIG. 2, a plurality of through-holes 18 are obliquely disposed relative to a side of the first electrode substrate 13. A cross-sectional view of a portion including the through-holes 18 shown in FIG. 1 is a cross-sectional view in which the portion is obliquely cut relative to the side of the first electrode substrate 13 so that the whole through-holes 18 may be passed through in FIG. 2. Examples described below will be in the same manner as this.

Figure 3:
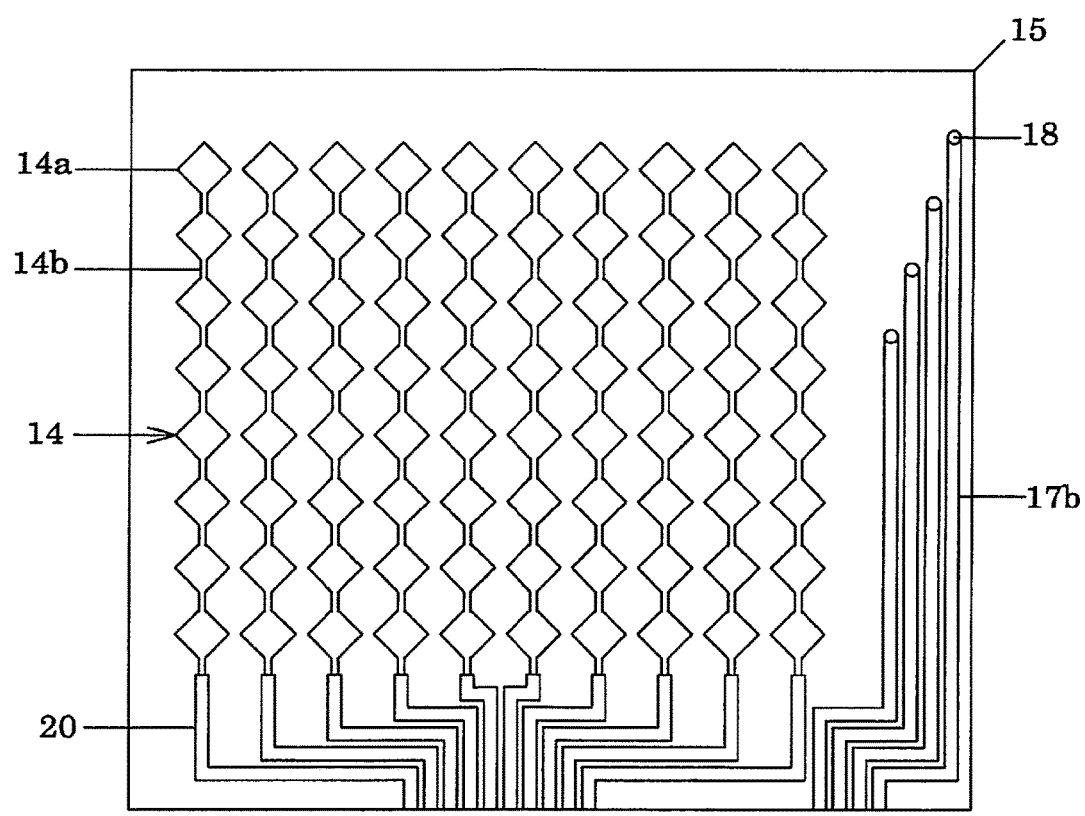
FIG. 3 is a layout drawing illustrating Y-direction transparent electrodes, Y-direction drawn-round wires, and X-direction drawn-round wires formed on an upper surface of a second electrode surface of a touch panel in Example 1 of the present invention.

A plurality of X-direction drawn-round wires are divided to be arranged on a lower surface of the first electrode substrate 13 and an upper surface of the second electrode substrate 15. A plurality of X-direction drawn-round wires 17a directly connected to transparent electrodes are arranged on the lower surface of the first electrode substrate 13. As shown in FIG. 1 and FIG. 3, a plurality of X-direction drawn-round wires 17b directly connected to external connections are arranged on the upper surface of the second electrode substrate 15. A part of the plurality of X-direction drawn-round wires 17a directly connected to transparent electrodes is used for external connection. The rest of the X-direction drawn-round wires 17a directly connected to transparent electrodes and the X-direction drawn-round wires 17b directly connected to external connections are electrically connected to each other by the through-holes 18 penetrating the adhesive layer 16. A conductive material 19 (a conductive paste such as silver ink, alternatively, anisotropic conductive material) is filled inside each of the through-holes 18. It is a principle to electrically connect ends of the X-direction drawn-round wires 17 directly connected to transparent electrodes are connected to ends of the X-direction drawn-round wires 17b directly connected to the external connections at 1:1. In the case where dummy wires are arranged, however, the connection will be at 1:plural number of connections. This is also applied to Examples described below.

A plurality of Y-direction drawn-round wires are arranged on an upper surface of the second electrode substrate 15. Note that the plurality of Y-direction drawn-round wires are not indicated in FIG. 1. Materials for the X-direction drawn-round wires 17a, 17b and the Y-direction drawn-round wires are not particularly limited as long as the materials have a sufficiently low resistance. The X-direction drawn-round wires 17a, 17b and the Y-direction drawn-round wires are formed of a conductive paste such as a silver ink and a metallic thin layer such as copper, silver, tin, and alloy thereof. The X-direction drawn-round wires 17a, 17b and the Y-direction drawn-round wires are formed by a well-known method such as printing or etching or patterning such as photolithography. The X-direction drawn-round wires 17a, 17b and the Y-direction drawn-round wires each preferably have a thickness of about 1 μm to 15 μm (when a conductive paste is used) and a width (line) of about 10 μm to 100 μm. The X-direction drawn-round wires 17a, 17b and the Y-direction drawn-round wires each preferably have a space of about 10 μm to 100 μm. Examples described below are the same as Example 1.

FIG. 2 is a layout drawing of a plurality of X-direction transparent electrodes 12 and a plurality of X-direction drawn-round wires 17a directly connected to transparent electrodes. The plurality of X-direction transparent electrodes 12 and the plurality of X-direction drawn-round wires 17a directly connected to transparent electrodes should originally been indicated by broken lines because of being disposed on a lower surface of a first electrode substrate 13. However, the X-direction transparent electrodes 12 and the X-direction drawn-round wires 17a are indicated by solid lines for easy viewability.

In the X-direction transparent electrodes 12, a large number of diamond-shaped transparent electrode patterns 12a are electrically connected to one another by a plurality of connecting electrodes 12b with a small width in an X-direction (lateral direction) to be aligned in a lateral direction of a touch panel 10. A large number (for instance, 30) of X-direction transparent electrodes 12 are aligned parallel to a longitudinal direction of the touch panel 10. The X-direction transparent electrodes 12 are referred to as a first line, a second line, and a third line, . . . from the top. The shape of each X-direction transparent electrode 12 is not limited to the above, however, for example, the shape may typically be a simple strip. This is also applied to Examples described below.

The X-direction drawn-round wires 17a directly connected to transparent electrodes are connected to the X-direction transparent electrodes 12. Accordingly, the number of the X-direction drawn-round wires 17a directly connected to the transparent electrode is the same as the number of the X-direction transparent electrodes 12. For instance, when the number of the X-direction transparent electrodes is 30, the number of the X-direction drawn-round wires 17a directly connected to transparent electrodes is also 30. For explanation, in FIG. 2, an example, in which the number of the X-direction transparent electrodes 12 is 8 and the X-direction drawn-round wires 17a directly connected to transparent electrodes is 8, is provided. There may be a case where shield electrodes are provided except for the X-direction transparent electrodes 12 and there may be a case where the number of the X-direction drawn-round wires 17a is different from the number of the X-direction transparent electrodes 12. This is also applied to Examples described below.

As shown in FIG. 2, a first X-direction drawn-round wire 17a directly connected to transparent electrodes is connected to X-direction transparent electrodes 12 on a first line. A second X-direction drawn-round wire 17a directly connected to transparent electrodes is connected to the X-direction transparent electrodes 12 on a second line. As mentioned above, an eighth X-direction drawn-round wire 17a directly connected to transparent electrodes is connected to the X-direction transparent electrodes 12 on an eighth line.

As shown in FIG. 2, first to fourth X-direction drawn-round wires 17a directly connected to transparent electrodes and through-holes 18 are arranged on a lower surface of the first electrode substrate 13 (Accurately, the through-holes 18 are provided on the adhesive layer 16). The first to fourth X-direction drawn-round wires 17a directly connected to transparent electrodes are connected to the first to fourth X-direction drawn-round wires 17b directly connected to external connections arranged on an upper surface of a second electrode substrate 15 shown in FIG. 3.

Fifth to Eighth X-direction drawn-round wires 17a directly connected to transparent electrodes are arranged on a lower surface of the first electrode substrate 13. The fifth to eighth X-direction drawn-round wires 17a directly connected to transparent electrodes end on the lower surface of the first electrode substrate 13. The number of the X-direction drawn-round wires connected from the lower surface of the first electrode substrate to the upper surface of the second electrode substrate is not needed to be the same as the number of the X-direction drawn-round wires end on the lower surface of the first electrode substrate 13. And the X-direction drawn-round wires 17a directly connected to transparent electrodes that are connected to the through-holes are not limited to be adjacent in series but may be arranged at intervals of one and randomly. This is also applied to Examples described below.

In FIG. 2, when the wire width (line) of the X-direction drawn-round wires 17a directly connected to transparent electrodes and the space between the wires are respectively L (μm), and S (μm), the width in a lateral direction of the area of the drawn-round wires formed on the lower surface of the first electrode substrate 13 is (4L+3S) (μm). For instance, when the X-direction transparent electrodes and X-direction drawn-round wires are each 30, first to fifteenth X-direction drawn-round wires and through-holes are arranged on the lower surface of the first electrode substrate. Sixteenth to thirtieth X-direction drawn-round wires are arranged on the lower surface of the first electrode substrate.

FIG. 3 is a layout drawing of a plurality of Y-direction transparent electrodes 14, a plurality of Y-direction drawn-round wires 20, and a plurality of X-direction drawn-round wires 17b directly connected to external connections. In the plurality of Y-direction transparent electrodes 14, a large number of diamond-shaped transparent electrode patterns 14a are electrically connected to one another by connecting electrodes 14b with a small width in a Y-direction (longitudinal direction) to be aligned in a longitudinal direction of a touch panel 10. The shape of each Y-direction transparent electrode 14 is not limited to the above, however, for example, the shape may typically be a simple strip. And a large number (for instance, 40) of Y-direction transparent electrodes 14 are aligned parallel to a lateral direction of the touch panel 10. The Y-direction transparent electrodes 14 are referred to as a first row, a second row, and a third row, . . . from the top. This is also applied to Examples described below.

The first electrode substrate 13 and the second electrode substrate 14 are bonded so as not to overlap the transparent electrode patterns 12a in the X-direction transparent electrodes 12 and the transparent electrode patterns 14a in the Y-direction transparent electrodes 14. In FIG. 3, while the Y-direction transparent electrodes 14 and the X-direction transparent electrodes 12 are at right angles to each other (in the case of a planar view), preferred embodiments are not limited to this. The Y-direction transparent electrodes 14 may be disposed with a specified angle with the X-direction transparent electrodes 12. This is also applied to Examples described below.

The Y-direction drawn-round wires 20 are connected to the Y-direction transparent electrodes 14. The number of the Y-direction drawn-round wires 20 is the same as the number of the Y-direction transparent electrodes 14. For instance, when the number of the Y-direction transparent electrodes 14 is 40, the number of the Y-direction drawn-round wires 20 is also 40. In FIG. 3, an example, in which the number of the Y-direction transparent electrodes 14 is 10 and the Y-direction drawn-round wires 20 is 10, is provided. There may be a case where shield electrodes are provided in addition to the Y-direction transparent electrodes 14 and there may be a case where the number of the Y-direction drawn-round wires 20 is different from the number of the Y-direction transparent electrodes 14. This is also applied to Examples described below.

As shown in FIG. 3, a first Y-direction drawn-round wire 20 is connected to a plurality of Y-direction transparent electrodes 14 in a first row. A second Y-direction drawn-round wire 20 is connected to a plurality of Y-direction transparent electrodes 14 in a second row. As mentioned above, a tenth Y-direction drawn-round wire 20 is connected to a plurality of Y-direction transparent electrodes 14 in a tenth row.

As shown in FIG. 3, first to tenth Y-direction drawn-round wires 20 are arranged on an upper surface of the second electrode substrate 15. And first to fourth X-direction drawn-round wires 17b directly connected to external connections and a plurality of through-holes 18 connected thereto are arranged on an upper surface of the second electrode substrate 15 (More accurately, the through-holes 18 are provided on an adhesive layer 16). Lower ends of the X-direction drawn-round wires 17a directly connected to transparent electrodes shown in FIG. 2, lower ends of the X-direction drawn-round wires 17b directly connected to external connections shown in FIG. 3, lower ends of the Y-direction drawn-round wires 20 are externally connected by connectors (not shown).

When the number of the X-direction transparent electrodes 12 and the number of the X-direction drawn-round wires 17a directly connected to transparent electrodes are respectively 30, the wire width (line) of the X-direction drawn-round wires is set at 30 μm and the space between the wires is set at 30 μm. When the number of the X-direction drawn-round wires 17a directly connected to transparent electrodes provided on the first electrode substrate 13 in a longitudinal direction is 15 and the number of the X-direction drawn-round wires 17b directly connected to external connections that are provided on the second electrode substrate 15 in a longitudinal direction is 15, the width in a lateral direction of the area of the drawn-round wires formed on the lower surface of the first electrode substrate 13 is (30 μm+30 μm)×15=900 μm, which is a half of a conventional one. Accordingly, the lateral width of the area of the drawn-round wires arranged on the lower surface of the first electrode substrate 13 is minimized in about a half size of the conventional one. This is the same as in the lateral width of the area of the drawn-round wires arranged on the upper surface of the second electrode substrate 15. Even when the lateral width of the left and right frame of the touch panel 10 becomes smaller, there is sufficient area of the drawn-round wires.

The typical materials for the first electrode substrate 13 and the second electrode substrate 15 are each a polymer film such as polyester, polyethylene terephthalate, polycarbonate, polymethylmethacrylate, polyethylene naphthalate or a glass. The first electrode substrate 13 and the second electrode substrate 15 each preferably have a thickness of about 20 μm to 200 μm. This is also applied to Examples described below.

The typical materials for the X-direction transparent electrodes 12 and the Y-direction transparent electrodes 14 are each a conductive thin layer such as ITO (Indium Tin Oxide), ZnO (zinc oxide). Alternatively, the typical materials for the X-direction transparent electrodes 12 and the Y-direction transparent electrodes 14 are each a composite material in which carbon nanotube, carbon nanowire, carbon nanofiber, graphitefibril, extra fine metallic fibers are dispersed in a polymer. Alternatively, extra fine conductive wires are formed by printing and photography. To make the conductive wires difficult to view, the width of the conductive wires is preferably 10 μm or smaller to make the conductive wires difficult to view, more preferably 5 μm or smaller, further preferably 2 μm or smaller. To increase the transmission rate of the X-direction transparent electrodes 12 and the Y-direction transparent electrodes 14, the pitch of the conductive wires is preferably about 100 μm to 1,000 μm. This is also applied to Examples described below.

A typical example of the adhesive layer 16 is a layer formed by a silicone optical transparent adhesive, an epoxy optical transparent adhesive or an acrylic optical transparent adhesive. The adhesive layer 16 preferably has a thickness of about 10 μm to 200 μm. A thermosetting adhesive or a photo-curable adhesive may be used. This is also applied to Examples described below.

When putting a finger closer to the touch panel 10, capacitance in the X-direction transparent electrodes 12 and the Y-direction transparent electrodes 14 that are close to the finger varies. X-coordinates and Y-coordinates of the finger are detected by switching a signal to respective electrodes to detect such electrical changes. Examples of a detection method include a self-capacity detection method and a mutual capacity detection method. This is also applied to Examples described below.

Through-Hole

Figure 4:
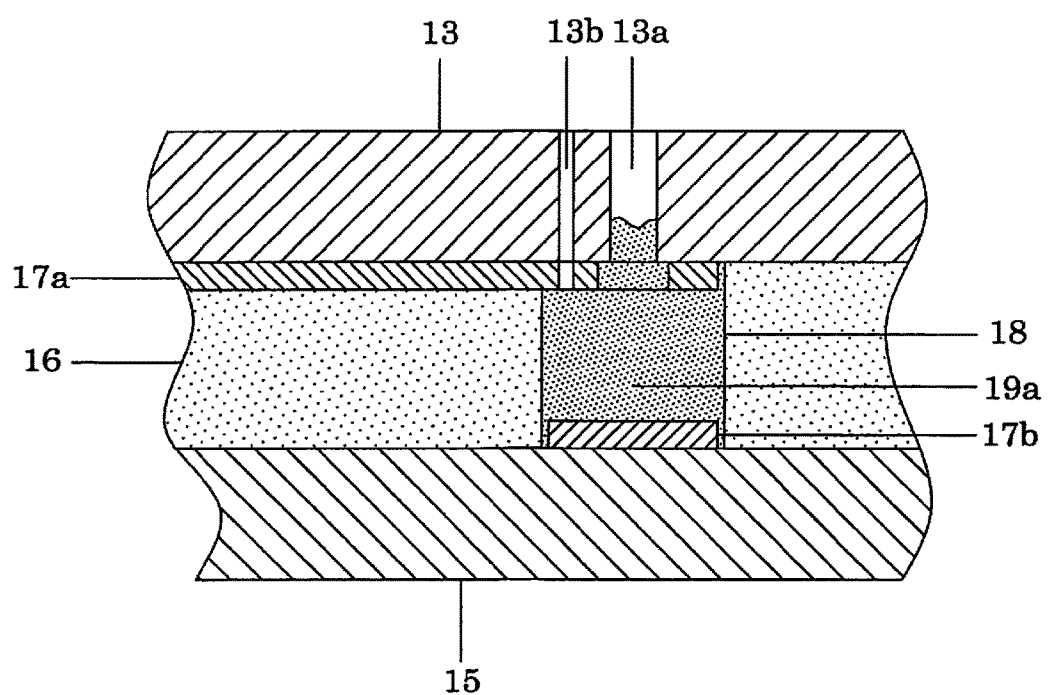
FIG. 4 is an enlarged cross-sectional view illustrating the vicinity of through-holes used for the touch panel in Example 1 of the present invention.

FIG. 4 is an enlarged cross-sectional view of a through-hole 18 that connects an X-direction drawn-round wire 17a directly connected to an external connection to an X-direction drawn-round wire 17b directly connected to an external connection. In conformity with ends of the X-direction drawn-round wire 17a directly connected to transparent electrodes and the X-direction drawn-round wire 17b directly connected to external connections, the through-hole 18 is made in the adhesive layer 16 by a drill or laser. In conformity with the through-hole 18 of the adhesive layer 16, a conductive paste inlet 13a and an air outlet 13b are provided on the first electrode substrate 13. This is also applied to Examples described below.

A conductive paste 19a is injected in the through-hole 18 from the conductive paste inlet 13a by a dispenser and is filled to be cured. The conductive paste inlet 13a is blocked by an insulator not shown. The X-direction drawn-round wire 17a arranged on the lower surface of the first electrode substrate 13 is electrically connected to the X-direction drawn-round wire 17b arranged on the upper surface of the second electrode substrate 15 by the conductive paste 19a. The conductive paste 19a is not particularly limited as long as the material for the conductive paste 19a has conductivity. Typical examples of the material for the conductive paste 19a include a conductive ink or solder typically including metal fine particles and a binder. This is also applied to Examples described below.

Figure 5A:
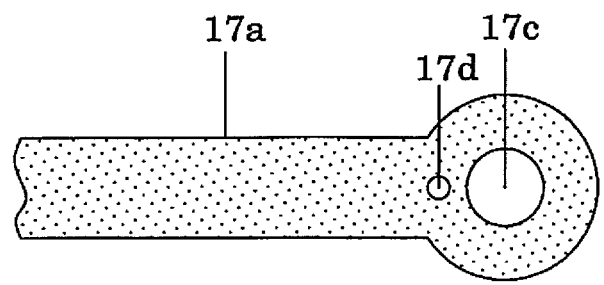
FIG. 5A is an enlarged view of a through-hole connection of an X-direction drawn-round wire formed on a lower surface of the first electrode substrate of a touch panel in Example 1 of the present invention.
Figure 5B:
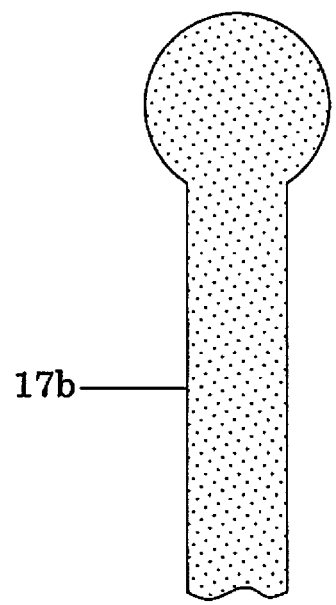
FIG. 5B is an enlarged view of a through-hole connection portion of an X-direction drawn-round wire formed on an upper surface of the second electrode substrate of the touch panel in Example 1 of the present invention.

FIG. 5A is an enlarged view of a connection portion with a through-hole 18 of an X-direction drawn-round wire 17a formed on a lower surface of a first electrode substrate 13 of the touch panel 10 in Example 1 of the present invention. FIG. 5B is an enlarged view of a connection portion with the through-hole 18 in an X-direction drawn-round wire 17b formed on an upper surface of a second electrode substrate 15 of the touch panel 10 in Example 1. A central hole 17c in the connection portion with the X-direction drawn-round wire 17a directly connected to a transparent electrode formed on a lower surface of the first electrode substrate 13 is an opening to inject a conductive paste 19a. A small hole 17d adjacent to that is an air outlet when injecting the conductive paste 19a. This is also applied to Examples described below.

Figure 6:
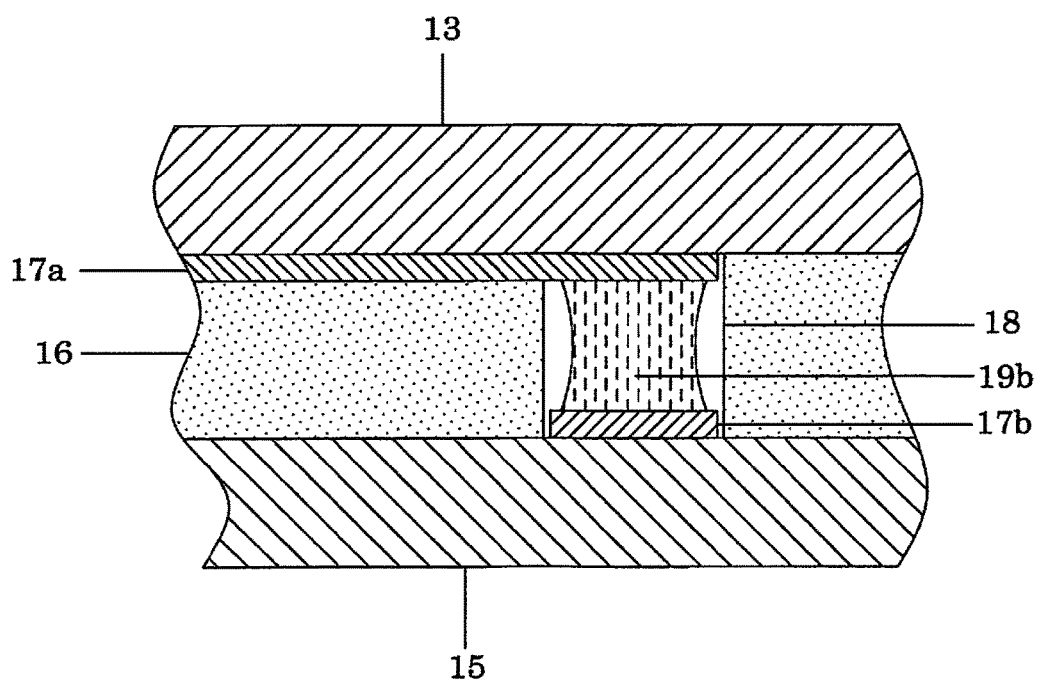
FIG. 6 is an enlarged cross-sectional view illustrating the vicinity of through-holes of other structure used in the touch panel in Example 1 of the present invention.

FIG. 6 is an enlarged view of a through-hole 18 having another structure to be used in the touch panel 10. In conformity with ends of the X-direction drawn-round wire 17a directly connected to the transparent electrode that is formed on a lower surface of the first electrode substrate 13 and ends of the X-direction drawn-round wire 17b directly connected to the external connection formed on an upper surface of the second electrode substrate 15, the through-hole 18 is formed on an adhesive layer 16 to fill an anisotropic conductive material 19b in the through-hole 18. This is also applied to Examples described below.

The ends of the X-direction drawn-round wire 17a directly connected to the transparent electrode that is formed on the lower surface of the first electrode substrate 13 and the ends of the X-direction drawn-round wire 17b directly connected the external connection that is formed on the upper surface of the second electrode substrate 15 are electrically connected to each other by the anisotropic conductive material 19b and pressure heating (heat sealing). An elastic material having conductivity may be disposed in the through-hole 18 to be conducted as the other conductive material 19. This is also applied to Examples described below.

As mentioned above, while a configuration to reduce the width of the area of the X-direction drawn-round wires by moving about a half of the X-direction drawn-round wires to the area having no wires of the other electrode substrate is indicated, it is possible for the Y-direction drawn-round wires to have the similar configuration. More specifically, Y-direction drawn-round wires (not shown) are provided on a lower surface of the first electrode substrate 13. And Y-direction drawn-round wires 20 are provided on an upper surface of the second electrode substrate 15 to be electrically connected to Y-direction drawn-round wires 20 provided on an upper surface of the second electrode substrate 15 by through-holes (not shown).

This configuration makes it possible to reduce the width of the area of the Y-direction drawn-round wires. This is also applied to Examples described below.

Example 2 of Touch Panel of the Present Invention

Figure 7:
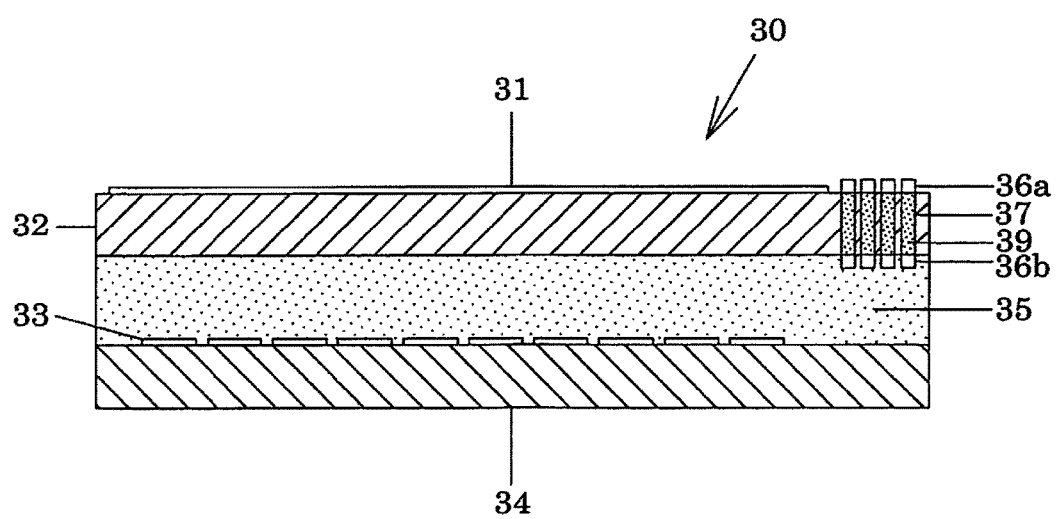
FIG. 7 is a cross-sectional view of a touch panel in Example 2 of the present invention.

FIG. 7 is a cross-sectional view of a touch panel in Example 2 of the present invention. In a touch panel 30, a first electrode substrate 32 having an X-direction transparent electrode 31 on an upper surface thereof, and a second electrode substrate 34 having a plurality of Y-direction transparent electrodes 33 on an upper surface thereof are joined by an adhesive layer 35. Accordingly, the first electrode substrate 32 and the adhesive layer 35 are sandwiched between the X-direction transparent electrode 31 and the Y-direction transparent electrodes 33. It is not shown, however, the X-direction transparent electrode 31 is covered with a protective film or a cover glass.

A plurality of X-direction drawn-round wires are divided to be arranged on an upper surface and a lower surface of the first electrode substrate 32. A plurality of X-direction drawn-round wires 36a directly connected to transparent electrodes are arranged on the upper surface of the first electrode substrate 32. A plurality of X-direction drawn-round wires 36b directly connected to external connections are arranged on the lower surface of the first electrode substrate 32. A part of the plurality of X-direction drawn-round wires 36a directly connected to transparent electrodes is used for external connection. The X-direction drawn-round wires 36a directly connected to transparent electrodes and the X-direction drawn-round wires 36b directly connected to external connections are electrically connected to each other by through-holes 37 penetrating the first electrode substrate 32. A conductive material 39 is filled inside each of the through-holes 37.

Figure 8:
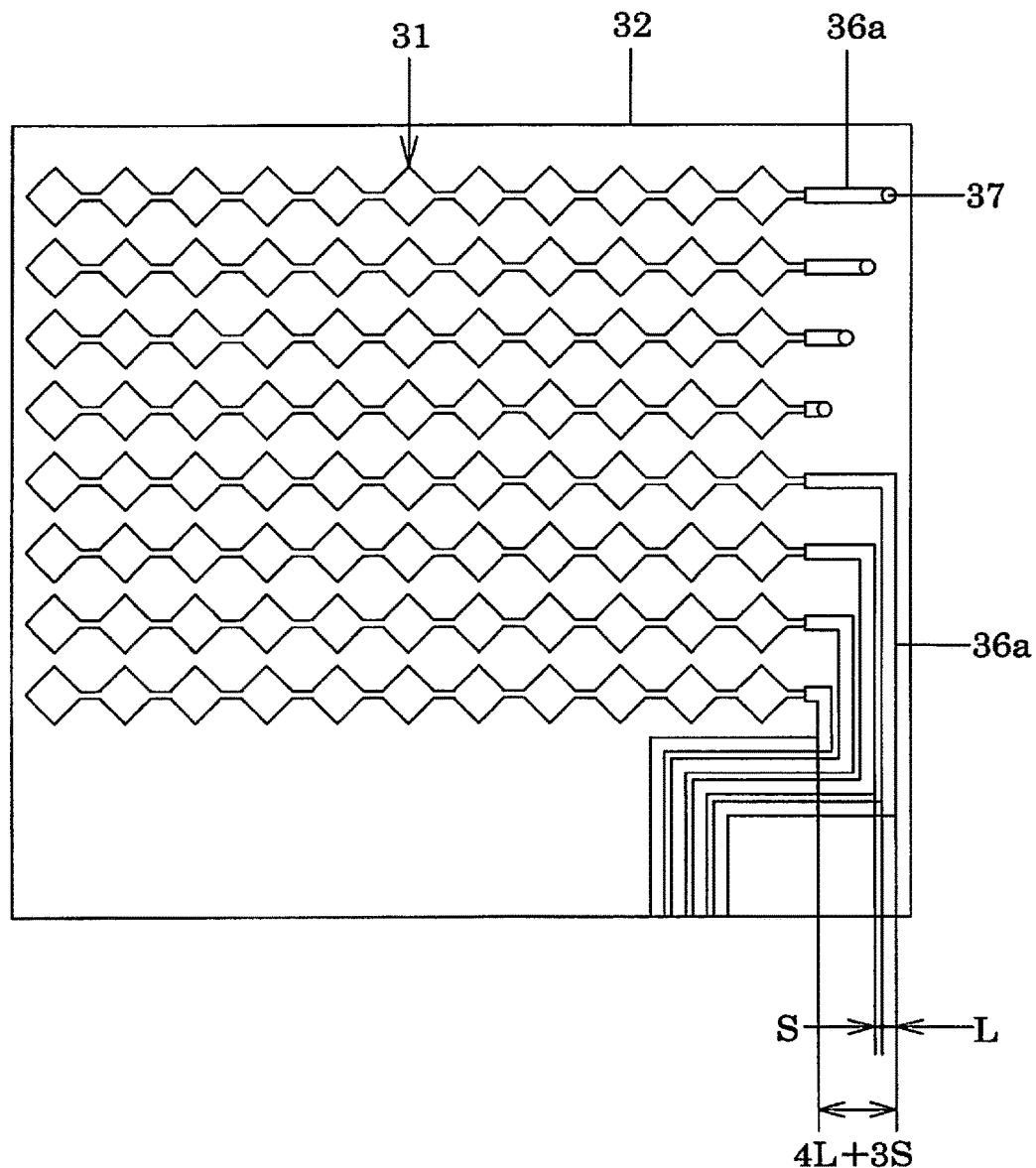
FIG. 8 is a layout drawing of X-direction transparent electrodes and X-direction drawn-round wires formed on an upper surface of the first electrode substrate of the touch panel in Example 2 of the present invention.

FIG. 8 is a layout drawing of a plurality of X-direction transparent electrodes 31 and a plurality of X-direction drawn-round wires 36a directly connected to transparent electrodes that are formed on an upper surface of a first electrode substrate 32 of a touch panel 30. Since the plurality of X-direction transparent electrodes 31 and the plurality of X-direction drawn-round wires 36a directly connected to transparent electrodes are similar to those shown in FIG. 2, explanation is omitted.

Figure 9:
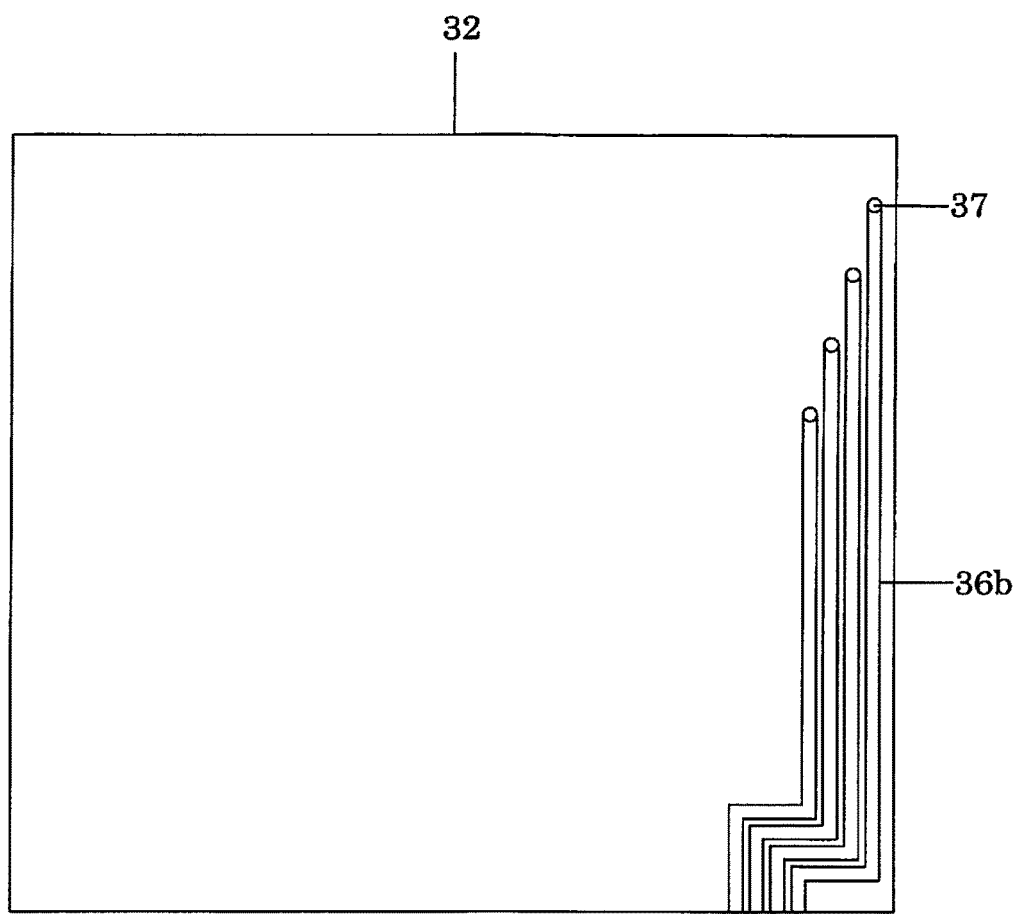
FIG. 9 is a layout drawing of X-direction drawn-round wires formed on a lower surface of the first electrode substrate of the touch panel in Example 2 of the present invention.

FIG. 9 is a layout drawing of first to fourth X-direction drawn-round wires 36b directly connected to external connections that are arranged on a lower surface of a first electrode substrate 32. Since the X-direction drawn-round wires 36b directly connected to external connections and a plurality of X-direction drawn-round wires 36a directly connected to transparent electrodes are connected to each other in the same manner as in FIG. 3, explanation is omitted.

Figure 10:
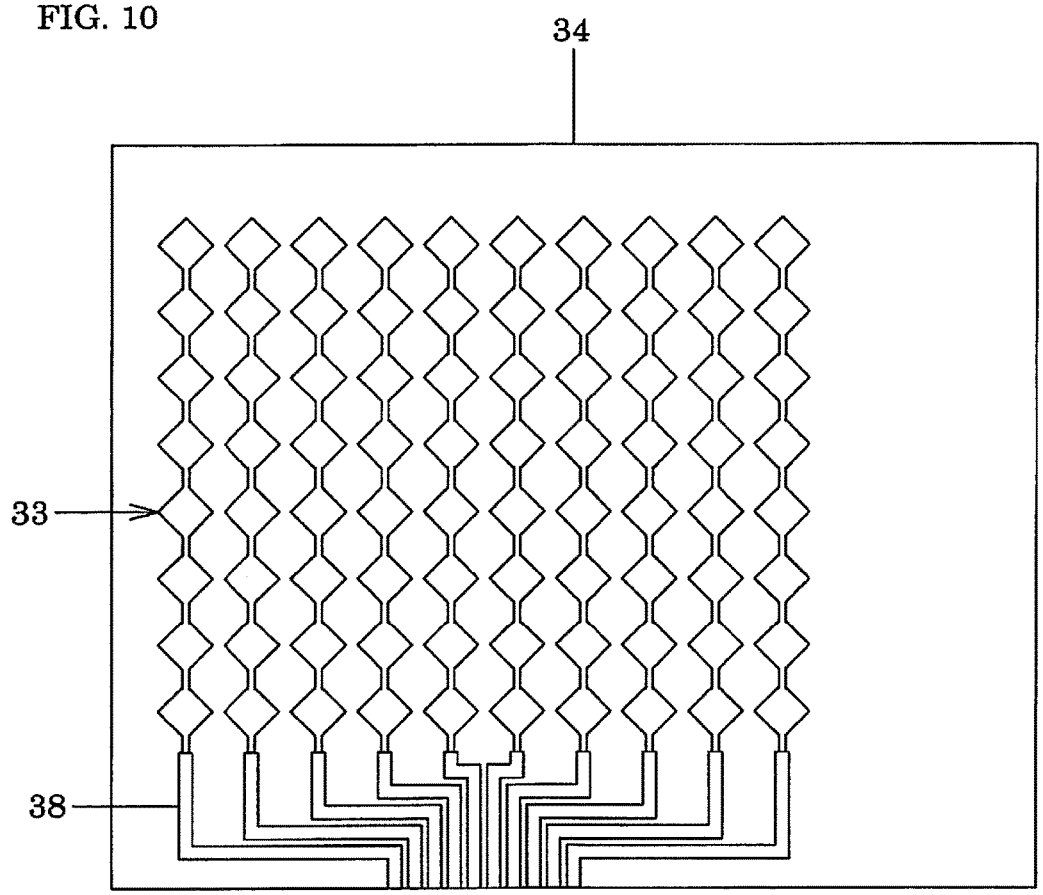
FIG. 10 is a layout drawing of Y-direction transparent electrodes and Y-direction drawn-round wires formed on an upper surface of the second electrode substrate of the touch panel in Example 2 of the present invention.

FIG. 10 is a layout drawing of a plurality of Y-direction transparent electrodes 33 and a plurality of Y-direction drawn-round wires 38 formed on an upper surface of a second electrode substrate 34 of a touch panel 30. Since the plurality of Y-direction transparent electrodes 33 and the plurality of Y-direction drawn-round wires 38 are in the same manner as shown in FIG. 3, explanation is omitted.

Lower ends of the X-direction drawn-round wires 36a directly connected to transparent electrodes shown in FIG. 8, lower ends of the X-direction drawn-round wires 36b directly connected to external connections shown in FIG. 9, and lower ends of the Y-direction drawn-round wires 36 shown in FIG. 10 are externally connected by a connector (not shown).

Example 3 of Touch Panel of the Present Invention

Figure 11:
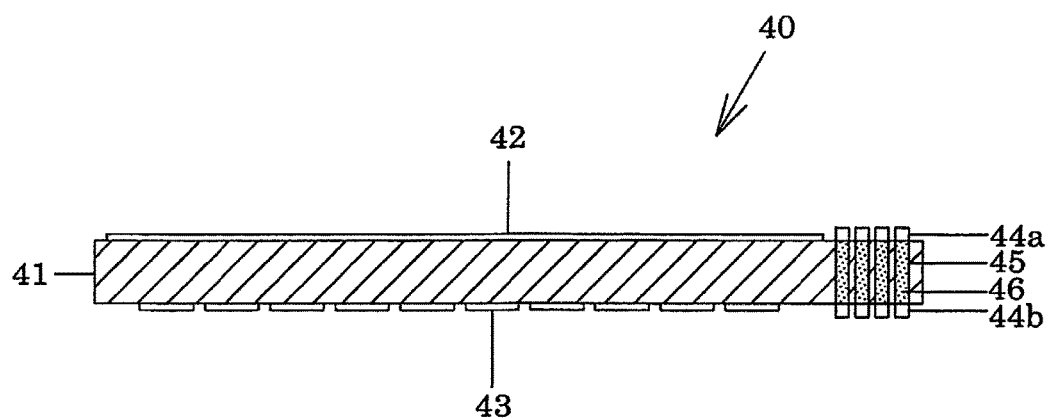
FIG. 11 is a cross-sectional view of a touch panel of in Example 3 of the present invention.

FIG. 11 is a cross-sectional view of a touch panel in Example 3. In a touch panel 40, an X-direction transparent electrode 42 is formed on an upper surface of an electrode substrate 41 and a plurality of Y-direction transparent electrodes 43 is formed on a lower surface of the electrode substrate 41. The X-direction transparent electrode 42 and the plurality of Y-direction transparent electrodes 43 are each covered with a protective cover not shown.

A plurality of X-direction drawn-round wires are divided to be arranged on an upper surface and a lower surface of the electrode substrate 41. A plurality of X-direction drawn-round wires 44a directly connected to transparent electrodes are arranged on the upper surface of the first electrode substrate 41. A plurality of X-direction drawn-round wires 44b directly connected to external connections are arranged on the lower surface of the electrode substrate 41. A part of the plurality of X-direction drawn-round wires 44a directly connected to transparent electrodes is used for external connection. The rest of the X-direction drawn-round wires 44a directly connected to transparent electrodes and the X-direction drawn-round wires 44b directly connected to external connections are electrically connected to each other by through-holes 45 penetrating the electrode substrate 41. A conductive material 46 is filled inside each of the through-holes 45.

Figure 12:
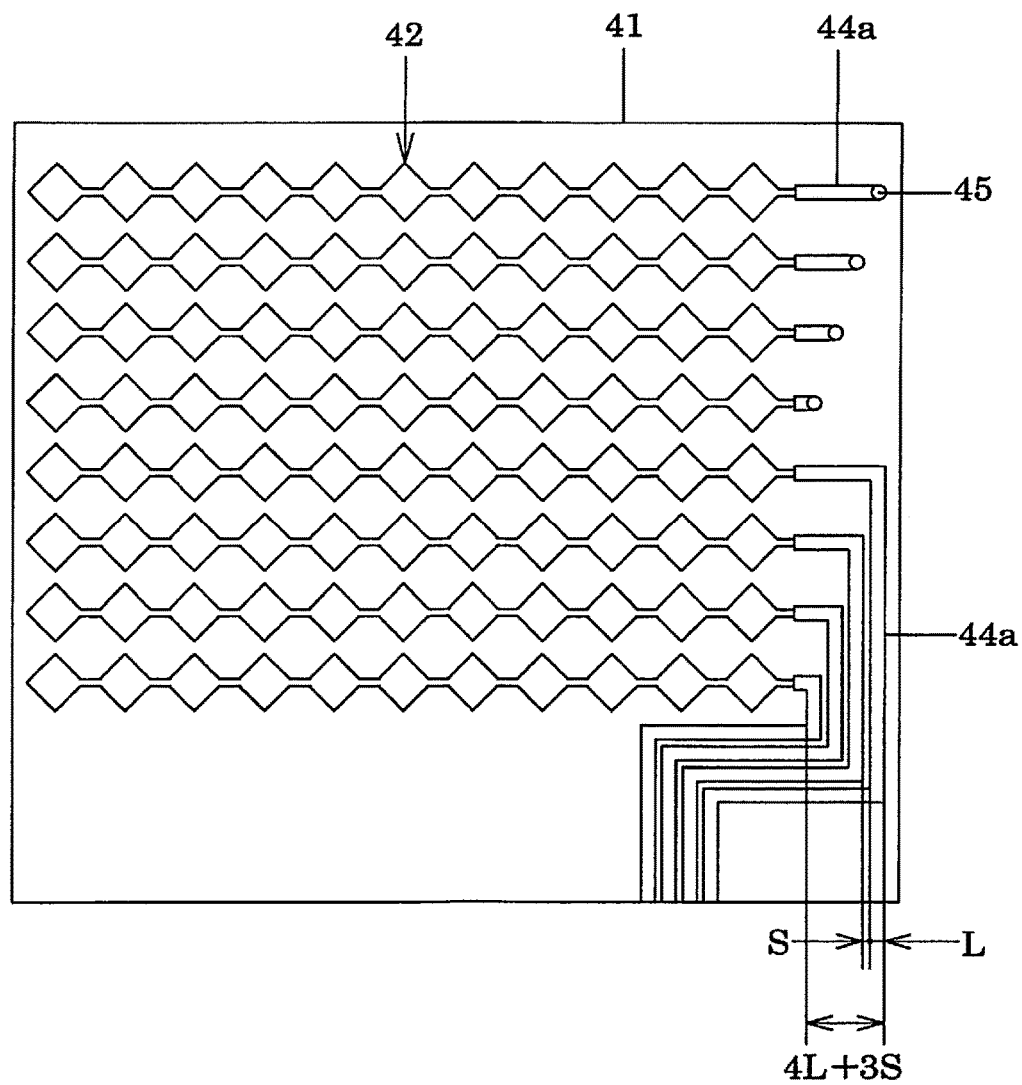
FIG. 12 is a layout drawing of X-direction transparent electrodes and X-direction drawn-round wires formed on an upper surface of the electrode substrate of the touch panel in Example 3 of the present invention.

FIG. 12 is a layout drawing of a plurality of X-direction transparent electrodes 42 and a plurality of X-direction drawn-round wires 44a directly connected to transparent electrodes that are formed on an upper surface of an electrode substrate 41 of a touch panel 40. Since the plurality of X-direction transparent electrodes 42 and the plurality of X-direction drawn-round wires 44a are similar to FIG. 2, explanation is omitted.

Figure 13:
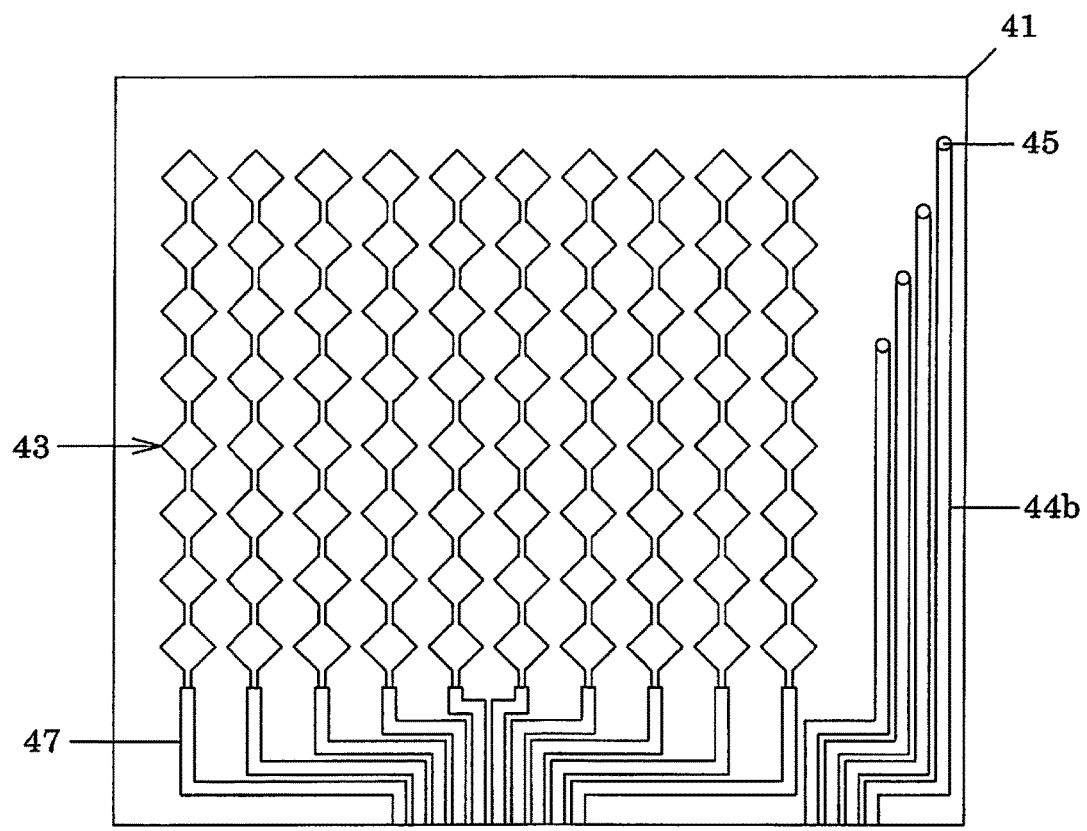
FIG. 13 is a layout drawing of Y-direction transparent electrodes, Y-direction drawn-round wires, and X-direction drawn-round wires formed on a lower surface of the electrode substrate of the touch panel in Example 3 of the present invention.

FIG. 13 is a layout drawing of a plurality of Y-direction transparent electrodes 43, a plurality of Y-direction drawn-round wires 47, and a plurality of X-direction drawn-round wires 44b directly connected to external connections. The plurality of Y-direction transparent electrodes 43, the plurality of Y-direction drawn-round wires 47, and the plurality of X-direction drawn-round wires 44b directly connected to external connections are similar to FIG. 3, explanation is omitted.

Example 4 of Touch Panel of the Present Invention

Figure 14:
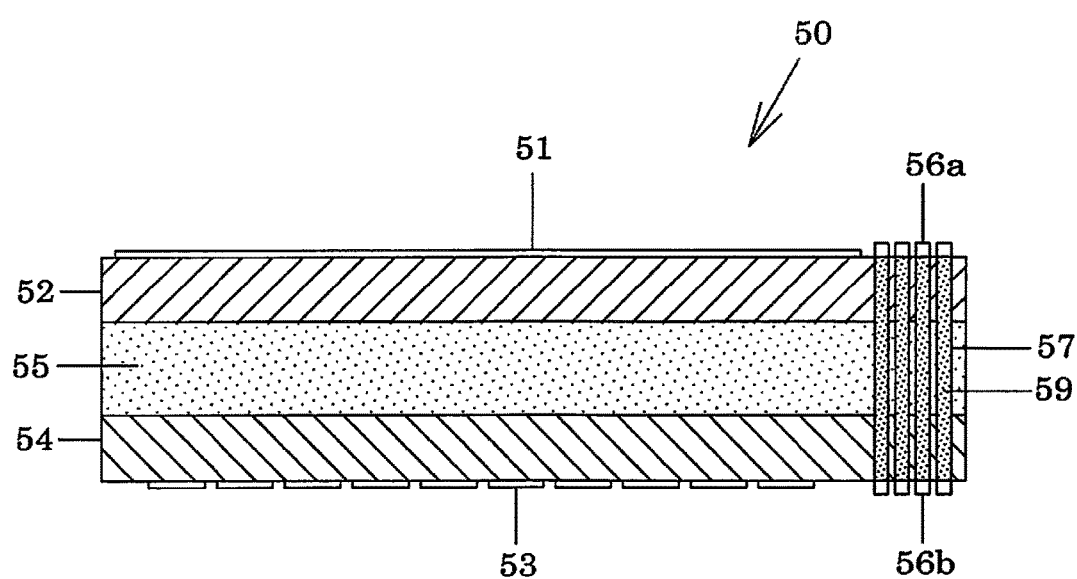
FIG. 14 is a cross-sectional view of a touch panel in Example 4 of the present invention.

FIG. 14 is a cross-sectional view of a touch panel in Example 4 of a touch panel of the present invention. In a touch panel 50, a first electrode substrate 52 having an X-direction transparent electrode 31 on an upper surface thereof, and a second electrode substrate 54 having a plurality of Y-direction transparent electrodes 53 on a lower surface thereof are joined by an adhesive layer 55. Accordingly, the first electrode substrate 52, the adhesive layer 55, and the second electrode substrate 54 are interposed between the X-direction transparent electrode 51 and the plurality of Y-direction transparent electrodes 53. It is not shown, however, the X-direction transparent electrode 51 and the Y-direction transparent electrodes 53 are each covered with a protective film or a cover glass.

A plurality of X-direction drawn-round wires are divided to be arranged on an upper surface of the first electrode substrate 52 and a lower surface of the second electrode substrate 54. A plurality of X-direction drawn-round wires 56a directly connected to transparent electrodes are arranged on the upper surface of the first electrode substrate 52. A plurality of X-direction drawn-round wires 56b directly connected to external connections are arranged on the lower surface of the second electrode substrate 54. A part of the plurality of X-direction drawn-round wires 56a directly connected to transparent electrodes is used for external connection. The rest of the X-direction drawn-round wires 56a directly connected to transparent electrodes and the X-direction drawn-round wires 56b directly connected to external connections are electrically connected to each other by through-holes 57 penetrating the second electrode substrate 54. A conductive material 59 is filled inside each of the through-holes 57.

Figure 15:
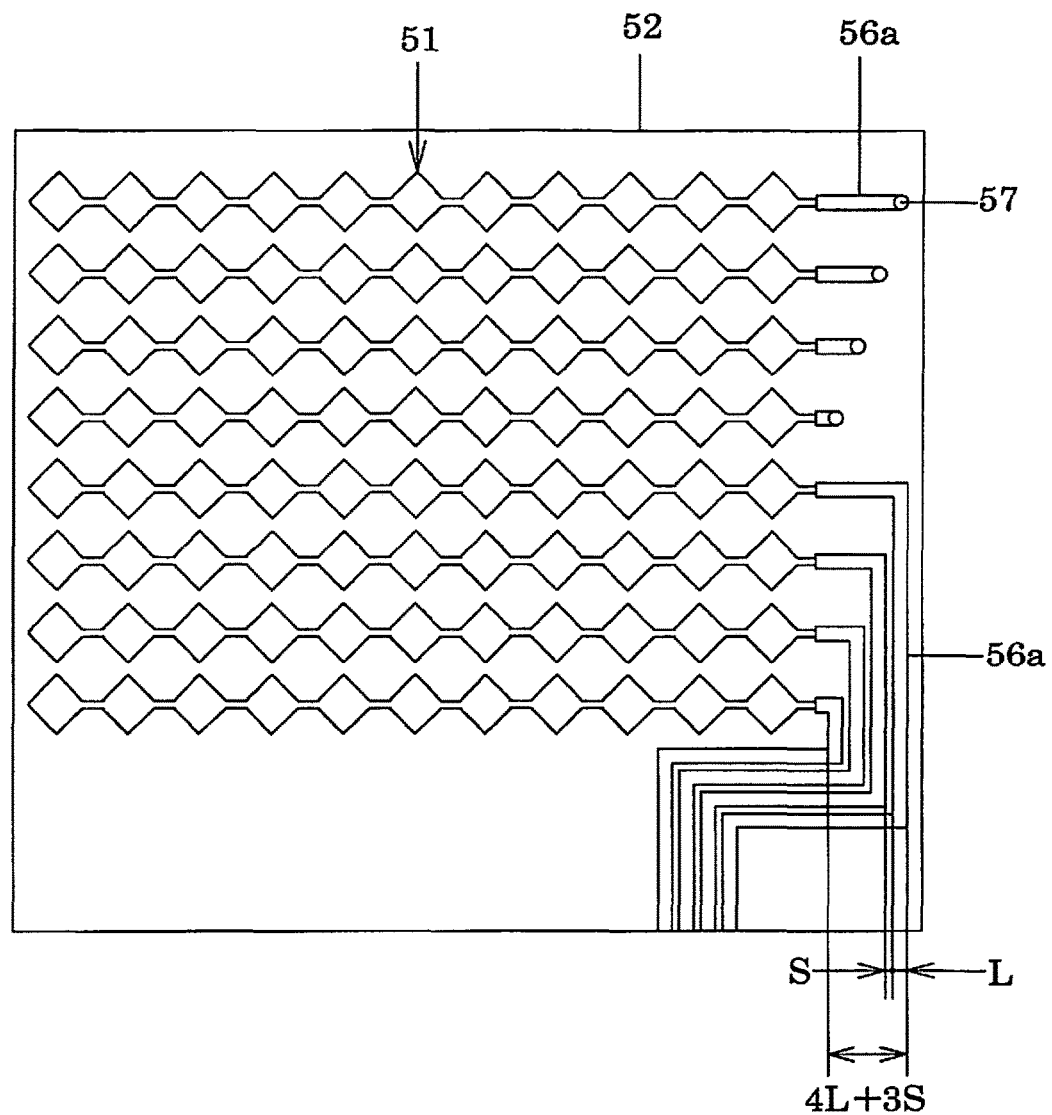
FIG. 15 is a layout drawing of X-direction transparent electrodes and X-direction drawn-round wires formed on an upper surface of the first electrode substrate of the touch panel in Example 4 of the present invention.

FIG. 15 is a layout drawing of a plurality of X-direction transparent electrodes 51 and a plurality of X-direction drawn-round wires 56a directly connected to transparent electrodes that are formed on an upper surface of a first electrode substrate 52 of a touch panel 50. Since the plurality of X-direction transparent electrodes 51 and the plurality of X-direction drawn-round wires 56a directly connected to transparent electrodes are similar to FIG. 2, explanation is omitted.

Figure 16:
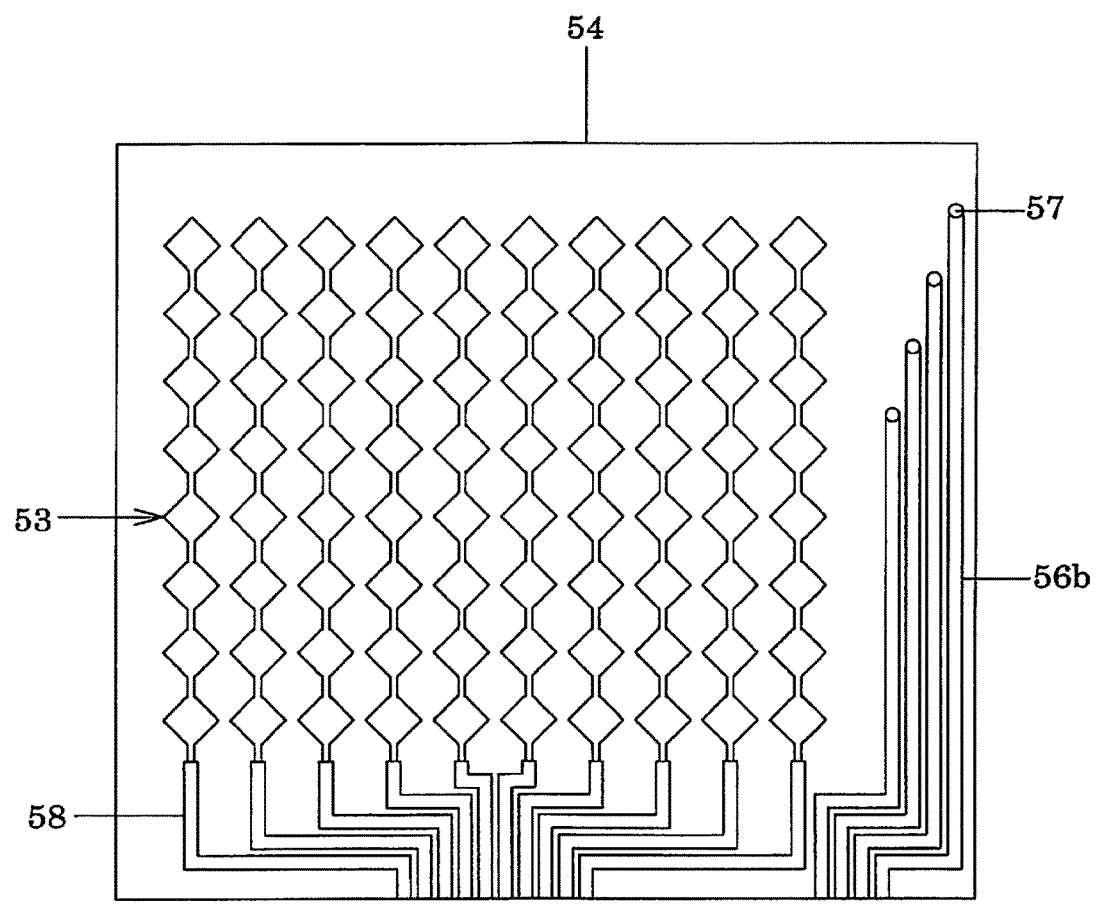
FIG. 16 is a layout drawing of Y-direction transparent electrodes and Y-direction drawn-round wires formed on a lower surface of the second electrode substrate of the touch panel in Example 4 of the present invention.

FIG. 16 is a layout drawing of a plurality of X-direction drawn-round wires 56b directly connected to external connections that are formed on a lower surface of a second electrode substrate 54 of a touch panel 50, Y-direction transparent electrodes 53, and a plurality of Y-direction transparent electrodes 58. Since the plurality of X-direction drawn-round wires 56b directly connected to external connections, the plurality of Y-direction transparent electrodes 53, and the plurality of Y-direction drawn-round wires 58 are similar to FIG. 3, explanation is omitted.

Lower ends of the X-direction drawn-round wires 56a directly connected to transparent electrodes shown in FIG. 15, lower ends of the X-direction drawn-round wires 56b directly connected to external connections shown in FIG. 16, and lower ends of the Y-direction drawn-round wires 58 are externally connected by a connector (not shown).

Example 5 of Touch Panel of the Present Invention

Figure 17:
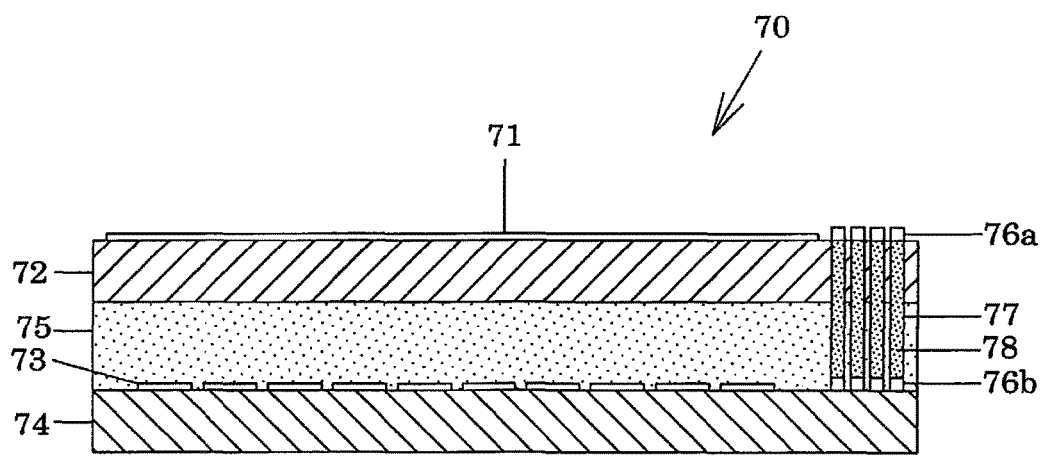
FIG. 17 is a cross-sectional view of a touch panel in Example 5 of the present invention.

FIG. 17 is a cross-sectional view of a touch panel of the present invention in Example 5. In a touch panel 70, a first electrode substrate 72 having an X-direction transparent electrode 71 on an upper surface thereof, and a second electrode substrate 74 having a plurality of Y-direction transparent electrodes 73 on an upper surface thereof are joined by an adhesive layer 75. Accordingly, the first electrode substrate 72 and the adhesive layer 75 are interposed between the X-direction transparent electrode 71 and the plurality of Y-direction transparent electrodes 73. It is not shown, however, the X-direction transparent electrode 71 is covered with a protective film or a cover glass.

A plurality of X-direction drawn-round wires are divided to be arranged on an upper surface of the first electrode substrate 72 and an upper surface of the second electrode substrate 74. A plurality of X-direction drawn-round wires 76a directly connected to transparent electrodes are arranged on the upper surface of the first electrode substrate 72. The plurality of X-direction drawn-round wires 76b directly connected to external connections are arranged on the upper surface of the second electrode substrate 74. The plurality of X-direction drawn-round wires 76a directly connected to transparent electrodes are partially used for external connection. The rest of the X-direction drawn-round wires 76a directly connected to transparent electrodes and the X-direction drawn-round wires 76b directly connected to external connections are electrically connected to each other by through-holes 77 penetrating the first electrode substrate 72 and the adhesive layer 75. A conductive material 78 is filled inside each of the through-holes 77.

In the touch panel 70, it is possible to make an ejection surface of a connector (not shown) to connect the X-direction drawn-round wires 76a, 76b, and Y-direction drawn-round wires not shown (formed on an upper surface of the second electrode substrate 74) to divide into two surfaces: an upper surface of the first electrode substrate 72 and an upper surface of the second electrode substrate 74. The ejection surfaces mean surfaces to electrically connect a connector to ends of drawn-round wires by thermo-compression bonding by an anisotropic conductive material.

Example 6 of Touch Panel of the Present Invention

Figure 18:
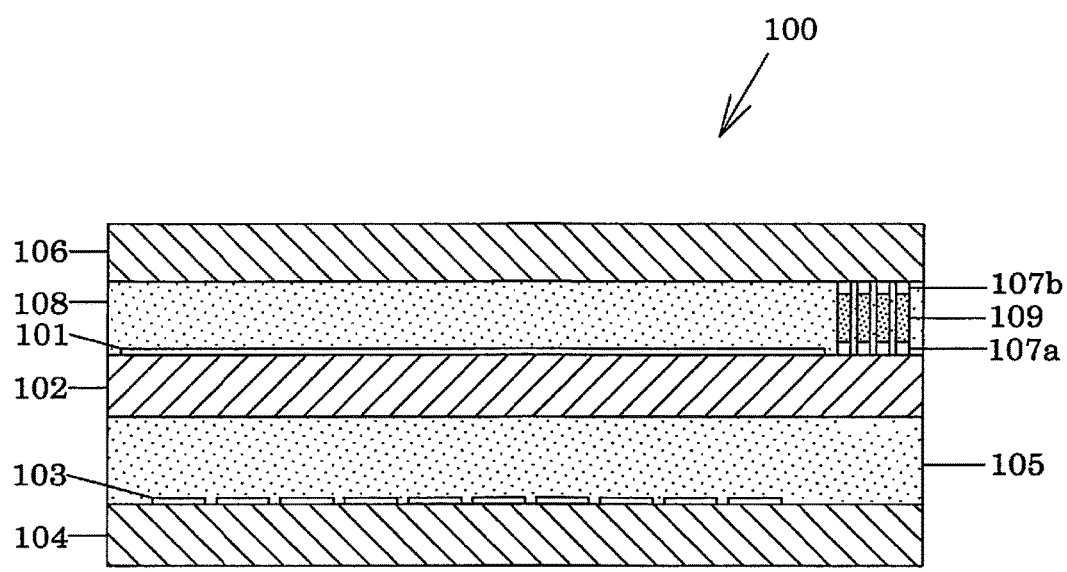
FIG. 18 is a cross-sectional view of a touch panel in Example 6 of the present invention.

FIG. 18 is a cross-sectional view of a touch panel of the present invention in Example 6. In a touch panel 100, a first electrode substrate 102 having an X-direction transparent electrode 101 on an upper surface thereof, and a second electrode substrate 104 having a plurality of Y-direction transparent electrodes 103 on an upper surface thereof are joined by a second adhesive layer 105. The first electrode substrate 102 and the second adhesive layer 105 are interposed between the X-direction transparent electrode 101 and the plurality of Y-direction transparent electrodes 103. A cover film 106 is joined to the first electrode substrate 102 by a first adhesive layer 108. The X-direction transparent electrode 101 is covered with a cover film 106. The cover film 106 is not limited to a resin material and may be an inorganic material such as a glass or a composite material.

A plurality of X-direction drawn-round wires are divided to be arranged on an upper surface of the first electrode substrate 102 and a lower surface of the cover film 106. A plurality of X-direction drawn-round wires 107a directly connected to transparent electrodes are arranged on the upper surface of the first electrode substrate 102. A plurality of X-direction drawn-round wires 107b directly connected to external connections are arranged on the lower surface of the cover film 106. The plurality of X-direction drawn-round wires 107a directly connected to transparent electrodes are partially used for external connection.

The X-direction drawn-round wires 107a directly connected to transparent electrodes and the X-direction drawn-round wires 107b directly connected to external connections are electrically connected to each other by through-holes 109.

As variations, when one third of the X-direction drawn-round wires are arranged on an upper surface of the first electrode substrate 102, one third of the X-direction drawn-round wires are arranged on a lower surface of the cover film 106 via through-holes, and the remaining one third of the X-direction drawn-round wires are arranged on a lower surface of the first electrode substrate 102 via through-holes, the width of the frame needed for the X-direction drawn-round wires is reduced to about one third.

Example 7 of Touch Panel of the Present Invention

Figure 19:
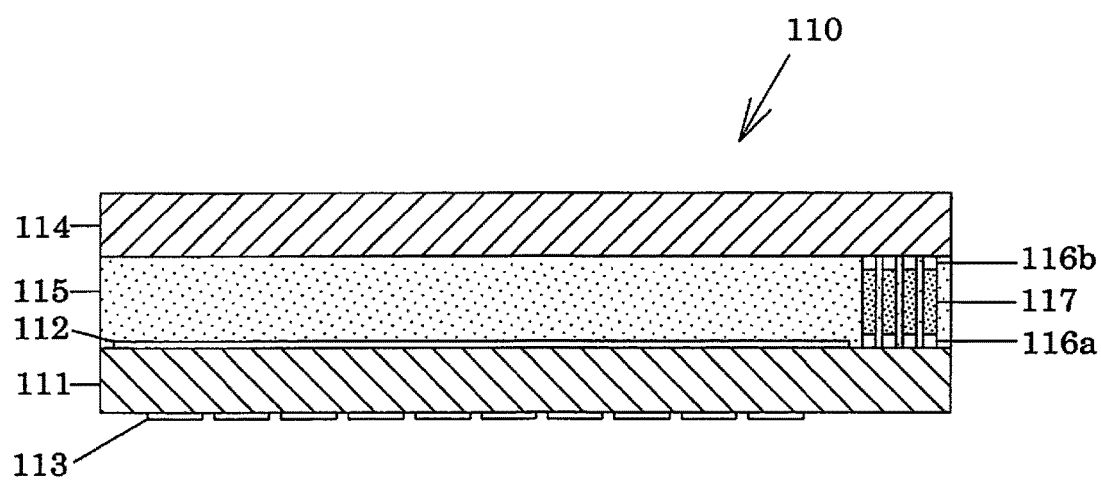
FIG. 19 is a cross-sectional view of a touch panel in Example 7 of the present invention.

FIG. 19 is a cross-sectional view of a touch panel of the present invention in Example 7. In a touch panel 110, an X-direction transparent electrode 112 is formed on an upper surface of an electrode substrate 111 is formed, and a plurality of Y-direction transparent electrodes 113 are formed on a lower surface of the electrode substrate 111. A cover film 114 is joined to the electrode substrate 111 by an adhesive layer 115. The cover film 114 is not limited to a resin material and may be an inorganic material such as a glass or a composite material.

A plurality of X-direction drawn-round wires are divided to be arranged on an upper surface of the electrode substrate 111 and a lower surface of the cover film 114. A plurality of X-direction drawn-round wires 116a directly connected to transparent electrodes are arranged on the upper surface of the electrode substrate 111. A plurality of X-direction drawn-round wires 116b directly connected to external connections are arranged on the lower surface of the cover film 114. The plurality of X-direction drawn-round wires 116a directly connected to transparent electrodes are partially used for external connection. The rest of the X-direction drawn-round wires 116a directly connected to transparent electrodes and the X-direction drawn-round wires 116b directly connected to external connections are electrically connected to each other by through-holes 117 penetrating the adhesive layer 115.

Example 8 of Touch Panel of the Present Invention

Figure 20:
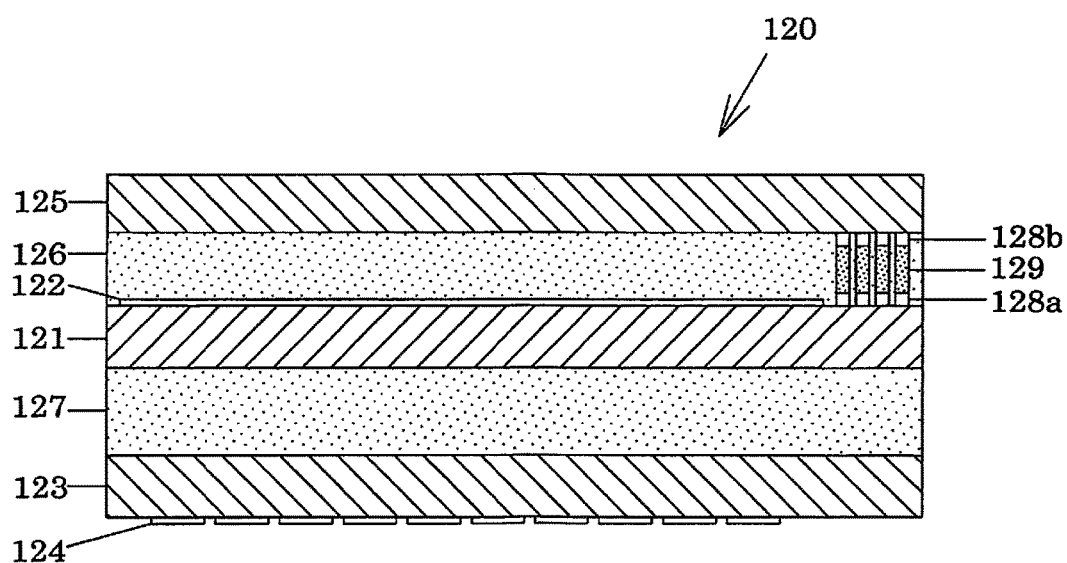
FIG. 20 is a cross-sectional view of a touch panel in Example 8 of the present invention.

FIG. 20 is a cross-sectional view of a touch panel of the present invention in Example 8. In a touch panel 120, an X-direction transparent electrode 122 is formed on an upper surface of a first electrode substrate 121, and a plurality of Y-direction transparent electrodes 124 are formed on a lower surface of a second electrode substrate 123. A cover film 125 is joined to the first electrode substrate 121 by a first adhesive layer 126. The cover film 125 is not limited to a resin material and may be an inorganic material such as a glass or a composite material. The first electrode substrate 121 is joined to the second electrode substrate 123 by a second adhesive layer 127.

A plurality of X-direction drawn-round wires are divided to be arranged on an upper surface of the first electrode substrate 121 and a lower surface of the cover film 125. A plurality of X-direction drawn-round wires 128a directly connected to transparent electrodes are arranged on the upper surface of the first electrode substrate 121. A plurality of X-direction drawn-round wires 128b directly connected to external connections are arranged on the lower surface of the cover film 125. The plurality of X-direction drawn-round wires 128a directly connected to transparent electrodes are partially used for external connection. The rest of the X-direction drawn-round wires 128a directly connected to transparent electrodes and the X-direction drawn-round wires 128b directly connected to external connections are electrically connected to each other by through-holes 129 penetrating the first adhesive layer 126.

Example 9 of Touch Panel of the Present Invention

Figure 21:
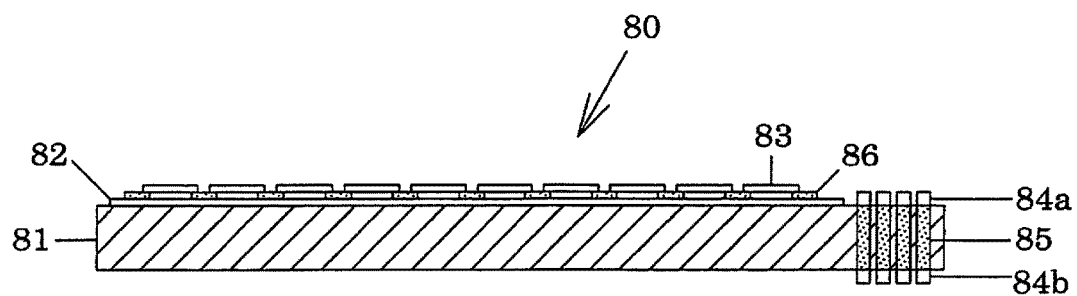
FIG. 21 is a cross-sectional view of a touch panel in Example 9 of the present invention.

FIG. 21 is a cross-sectional view of a touch panel of the present invention in Example 9. In a touch panel 80, a plurality of X-direction transparent electrodes 82 and a plurality of Y-direction transparent electrodes 83 are formed on an upper surface of an electrode substrate 81. The plurality of X-direction transparent electrodes 82 are separated from the plurality of Y-direction transparent electrodes 83 by a plurality of insulating layers 86. The X-direction transparent electrodes 82 and the Y-direction transparent electrodes 83 are each covered with a protective cover which is not shown.

A plurality of X-direction drawn-round wires are divided to be arranged on upper and lower surfaces of the electrode substrate 81. A plurality of X-direction drawn-round wires 84a directly connected to transparent electrodes are arranged on the upper surface of the electrode substrate 81. A plurality of X-direction drawn-round wires 84b directly connected to external connections are arranged on the lower surface of the electrode substrate 81. The plurality of X-direction drawn-round wires 84a directly connected to transparent electrodes are partially used for external connection. The rest of the X-direction drawn-round wires 84a directly connected to transparent electrodes and the X-direction drawn-round wires 84b directly connected to external connections are electrically connected to each other by through-holes 85 penetrating the electrode substrate 81.

Figure 22:
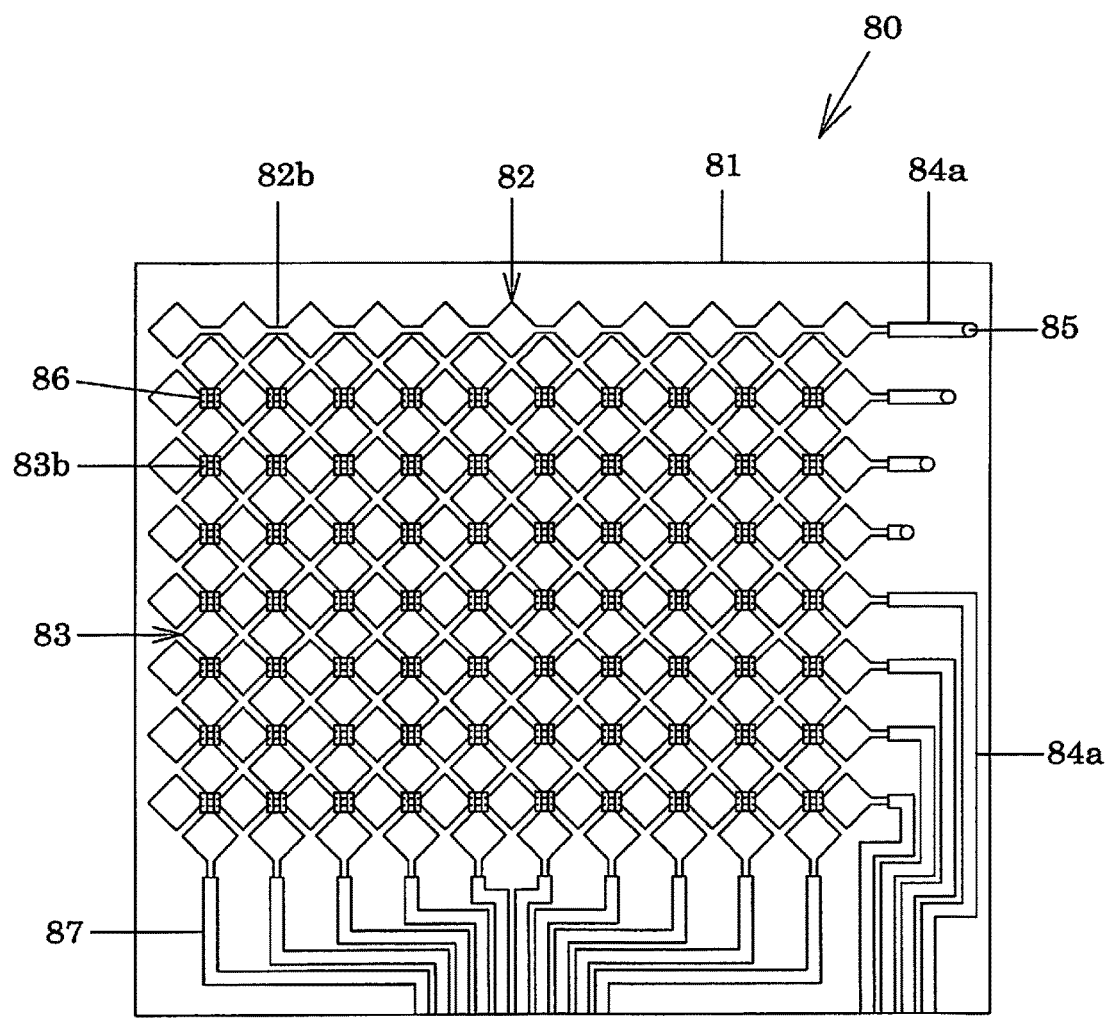
FIG. 22 is a layout drawing of X-direction transparent electrodes, X-direction drawn-round wires, Y-direction transparent electrodes, Y-direction drawn-round wires formed on an upper surface of the electrode substrate of the touch panel in Example 9 of the present invention.

FIG. 22 is a plan view of a touch panel 80. A plurality of insulating layers 86 covering a plurality of connecting electrodes 82b of the X-direction transparent electrodes 82 are provided and a plurality of connecting electrodes 83b of the Y-direction transparent electrodes 83 are formed on the plurality of insulating layers 86. This configuration makes it possible to provide the X-direction transparent electrodes 82 and the Y-direction transparent electrodes 83, and the Y-direction drawn-round wires 87 on one surface of a piece of electrode substrate 81.

It is not shown, however, the entire surfaces of the X-direction transparent electrodes 82 may be covered with insulating layers similar to the insulating layers 86 and the Y-direction transparent electrodes 83 may be arranged on the insulating layers. In this case, there is a difference in height between the Y-direction transparent electrodes 83 and the Y-direction drawn-round wires 87, which corresponds to the thickness of the insulating layers.

However, when a conductive paste is printed in a screen in such a manner that the Y-direction transparent electrodes 83 are connected to the Y-direction drawn-round wires 87, it is possible to clear the difference in height to allow the Y-direction transparent electrodes 83 and the Y-direction drawn-round wires 87 to be in continuity.

In the touch panel 80, it is possible to make an ejection surface of a connector (not shown) to connect the X-direction drawn-round wires 84a directly connected to transparent electrodes, the X-direction drawn-round wires 84b directly connected to external connections, and the Y-direction drawn-round wires 87 (formed on an upper surface of the electrode substrate 81) to divide into two surfaces: upper and lower surfaces of the electrode substrate 81.

Example 10 of Touch Panel of the Present Invention

Figure 23:
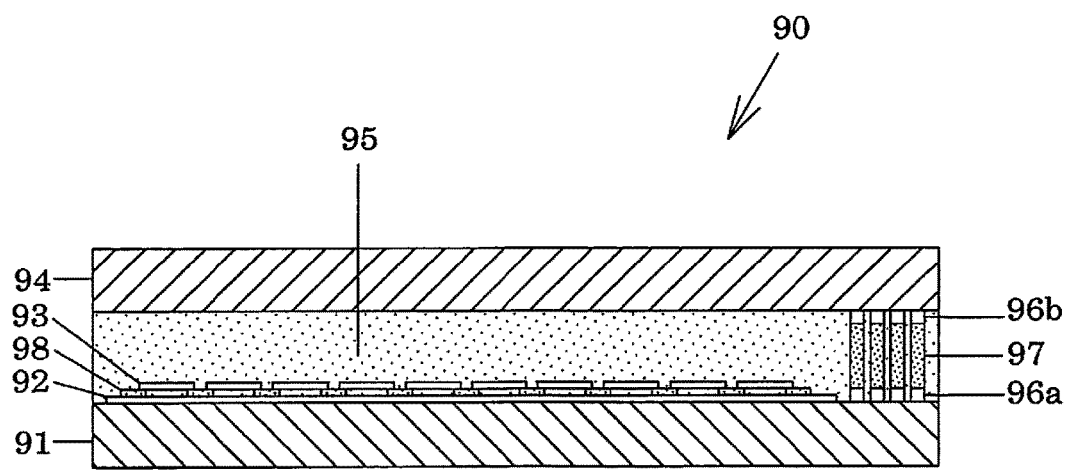
FIG. 23 is a cross-sectional view of a touch panel in Example 10 of the present invention.
Figure 24:
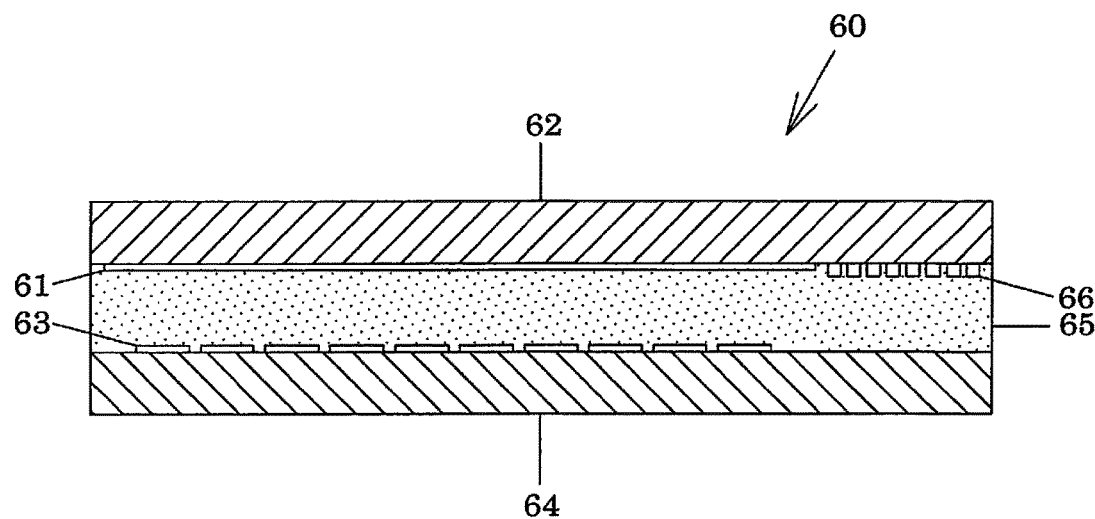
FIG. 24 is a cross-sectional view of a conventional touch panel.
Figure 25:
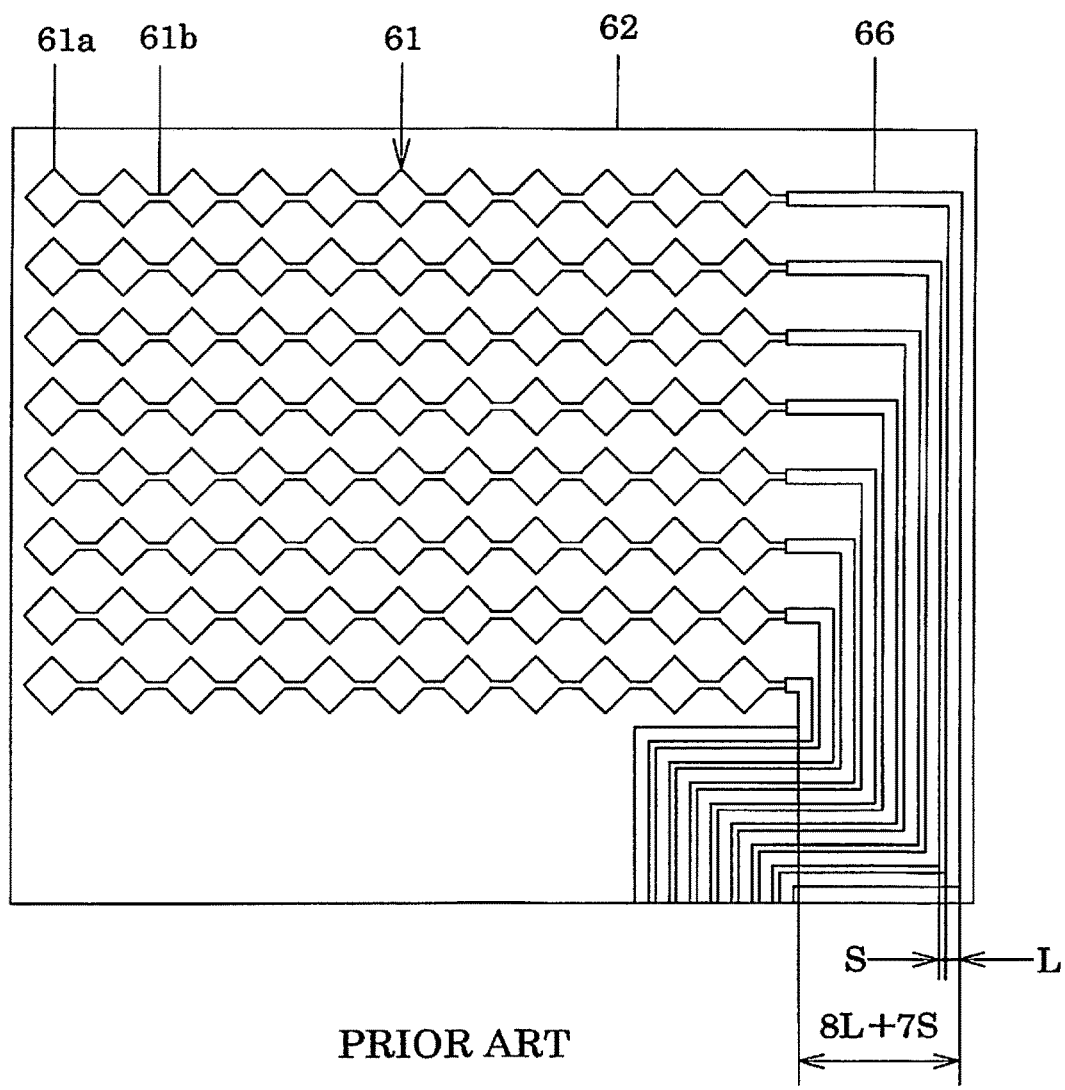
FIG. 25 is a layout drawing of X-direction transparent electrodes and X-direction drawn-round wires formed on a lower surface of the first electrode substrate of the conventional touch panel.
Figure 26:
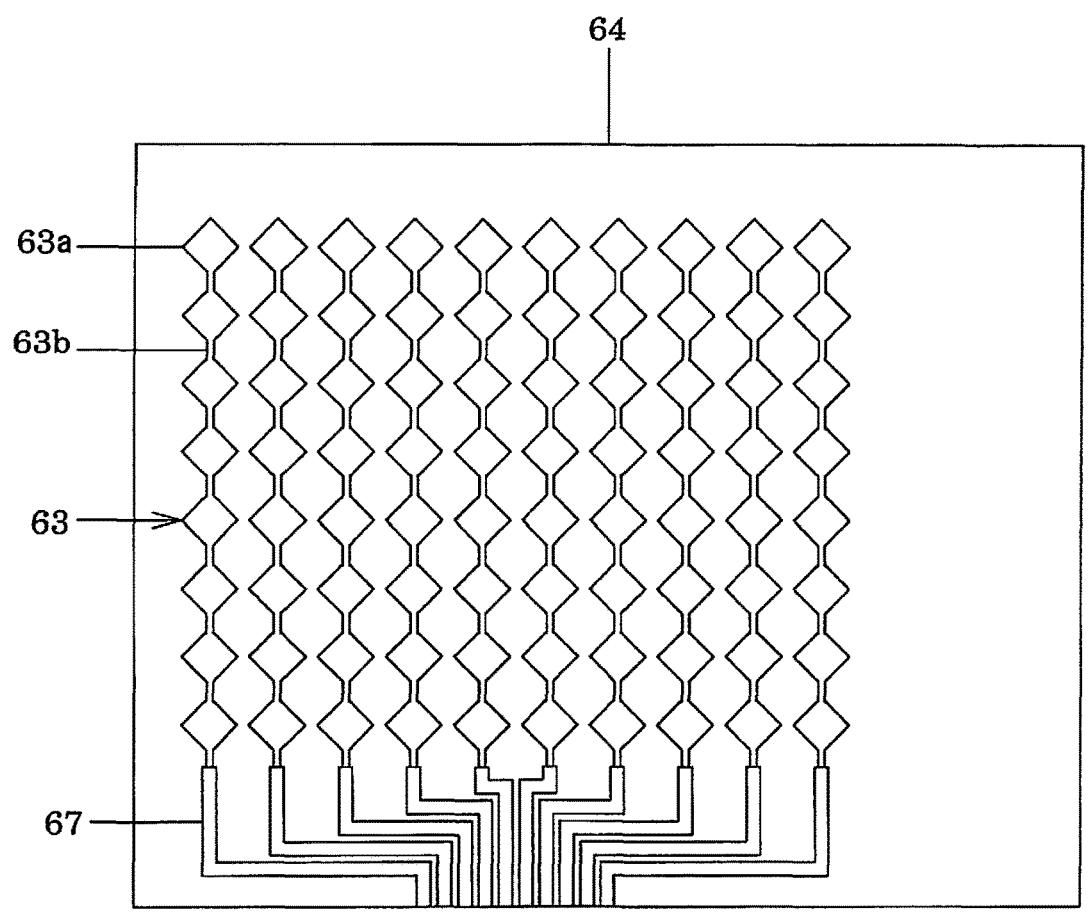
FIG. 26 is a layout drawing of Y-direction transparent electrodes and Y-direction drawn-round wires formed on an upper surface of the second electrode substrate of the conventional touch panel.

FIG. 23 is a cross-sectional view of a touch panel of the present invention in Example 10. In a touch panel 90, a plurality of X-direction transparent electrodes 92 and a plurality of Y-direction transparent electrodes 93 are formed on an upper surface of an electrode substrate 91. The plurality of X-direction transparent electrodes 92 are separated from the plurality of Y-direction transparent electrodes 93 by a plurality of insulating layers 98. The plurality of X-direction transparent electrodes 92 and the plurality of Y-direction transparent electrodes 93 are each covered with a cover film 94. The cover film 94 is not limited to a resin material and may be an inorganic material such as a glass or a composite material. The electrode substrate 91 is joined to the cover film 94 by an adhesive layer 95. The plurality of X-direction transparent electrodes 92 and the plurality of Y-direction transparent electrodes 93 formed on the upper surface of the electrode substrate 91 each have a similar configuration to the configuration of the touch panel 80 shown in FIG. 22.

A plurality of X-direction drawn-round wires are divided to be arranged on an upper surface of the electrode substrate 91 and a lower surface of the cover film 94. A plurality of X-direction drawn-round wires 96a directly connected to transparent electrodes are arranged on the upper surface of the electrode substrate 91. A plurality of X-direction drawn-round wires 96b directly connected to external connections are arranged on the lower surface of the cover film 94. The plurality of X-direction drawn-round wires 96a directly connected to transparent electrodes are partially used for external connection. The rest of the X-direction drawn-round wires 96a directly connected to transparent electrodes and the X-direction drawn-round wires 96b directly connected to external connections are electrically connected to each other by through-holes 97 penetrating the adhesive layer 95.

In the touch panel 90, it is possible to make an ejection surface of a connector (not shown) to connect the X-direction drawn-round wires 96a directly connected to transparent electrodes, the X-direction drawn-round wires 96b directly connected to external connections, and the Y direction drawn-round wires (not shown, however, formed on the upper surface of the electrode substrate 91) to divide into two surfaces: an upper surface of the electrode substrate 91; and a lower surface of the cover film 94.

As have been described above, in any examples, it is possible to reduce the width of the frame region of a touch panel.

The touch panel of the present invention is preferably used in combination with a liquid crystal panel with a frame having a small width.

There has thus been shown and described a novel touch panel which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:
1. A touch panel comprising:
a first electrode substrate;
a second electrode substrate;
a plurality of first transparent electrodes formed on at least one main surface of the first electrode substrate;
a plurality of second transparent electrodes formed on a main surface of the second electrode substrate;
a plurality of through-holes disposed between the first electrode substrate and the second electrode substrate;
a plurality of first drawn-round wires, a first group of the first drawn-round wires being directly connected to a first group of the first transparent electrodes without being directly connected to the plurality of through-holes such that the first group of the first drawn-round wires are used for external connection, and a second group of the first drawn-round wires being directly connected to a second group of the first transparent electrodes and the plurality of through-holes; and a plurality of second drawn-round wires connected to the plurality of second transparent electrodes.

2. The touch panel according to claim 1, wherein the plurality of second drawn-round wires comprise a first group of the second drawn-round wires directly connected to a first group of the second transparent electrodes; and a second group of the second drawn-round wires directly connected to external connections and to the plurality of through-holes.

3. The touch panel according to claim 1, further comprising:

an adhesive layer for joining the first and second electrode substrates, such that the plurality of through-holes penetrate the adhesive layer, wherein the first electrode substrate includes a main surface on which the first group of the first drawn-round wires are formed, and the second electrode substrate includes a main surface on which the second group of the first drawn-round wires are formed.

\* \* \* \* \*